United States Patent
Li et al.

(10) Patent No.: US 12,413,480 B2
(45) Date of Patent: Sep. 9, 2025

(54) NETWORK ATTACK DETECTION METHOD AND APPARATUS

(71) Applicant: Huawei Technologies Co., Ltd., Shenzhen (CN)

(72) Inventors: Shiguang Li, Beijing (CN); Mengwen Xu, Beijing (CN); Lijuan Jiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 17/956,591

(22) Filed: Sep. 29, 2022

(65) Prior Publication Data

US 2023/0025946 A1 Jan. 26, 2023

Related U.S. Application Data

(63) Continuation of application No. PCT/CN2020/133366, filed on Dec. 2, 2020.

(30) Foreign Application Priority Data

Mar. 31, 2020 (CN) .......................... 202010245563.2

(51) Int. Cl.
*H04L 41/14* (2022.01)
*H04L 9/40* (2022.01)
(Continued)

(52) U.S. Cl.
CPC ............ *H04L 41/145* (2013.01); *H04L 41/00* (2013.01); *H04L 63/1416* (2013.01);
(Continued)

(58) Field of Classification Search
CPC ... H04L 41/145; H04L 41/00; H04L 63/1416; H04L 63/145; H04L 67/02; H04L 69/22
See application file for complete search history.

(56) References Cited

U.S. PATENT DOCUMENTS

| | | | |
|---|---|---|---|
| 2011/0238855 A1* | 9/2011 | Korsunsky | .......... H04L 63/1441 709/231 |
| 2017/0142136 A1 | 5/2017 | Yi | |
| 2019/0141061 A1* | 5/2019 | Krishtal | ................ H04L 63/101 |

FOREIGN PATENT DOCUMENTS

| | | | | |
|---|---|---|---|---|
| CN | 105656886 A | | 6/2016 | |
| CN | 107241352 A | * | 10/2017 | ......... H04L 63/1416 |

(Continued)

*Primary Examiner* — Luu T Pham
*Assistant Examiner* — Paul J Skwierawski
(74) *Attorney, Agent, or Firm* — Slater Matsil, LLP

(57) ABSTRACT

A network attack detection method and apparatus is provided. The network protection device obtains first key data from received first network traffic, and matches the first key data with an attack signature in a signature database to obtain a first matching result; if the network protection device determines, based on the first matching result, that the first network traffic is aggressive, the network protection device obtains a target attack detection model based on the first network traffic, where the target attack detection model is used to identify one or more attack signatures that are different from the attack signature in the signature database; and when the network protection device receives second network traffic, the network protection device determines, based on the target attack detection model, whether the second network traffic is aggressive.

20 Claims, 9 Drawing Sheets

(51) Int. Cl.
*H04L 41/00* (2022.01)
*H04L 67/02* (2022.01)
*H04L 69/22* (2022.01)

(52) U.S. Cl.
CPC ............ *H04L 63/145* (2013.01); *H04L 67/02* (2013.01); *H04L 69/22* (2013.01)

(56) References Cited

FOREIGN PATENT DOCUMENTS

| | | |
|---|---|---|
| CN | 107835201 A | 3/2018 |
| CN | 108718310 A | 10/2018 |
| CN | 109858248 A | 6/2019 |
| CN | 110149315 A | 8/2019 |
| CN | 110855676 A | 2/2020 |
| WO | 2017148196 A1 | 9/2017 |

\* cited by examiner

NETWORK ATTACK DETECTION METHOD AND APPARATUS

CROSS-REFERENCE TO RELATED APPLICATIONS

This application is a continuation of International Application No. PCT/CN2020/133366, filed on Dec. 2, 2020, which claims priority to Chinese Patent Application No. 202010245563.2, filed on Mar. 31, 2020. The disclosures of the aforementioned applications are hereby incorporated by reference in their entireties.

TECHNICAL FIELD

Embodiments of this application relate to the field of computer network technologies, and further relate to application of an artificial intelligence (AI) technology in the computer network field, and in particular, to a network attack detection method and apparatus.

BACKGROUND

A network protection device (for example, a security gateway device or a firewall) detects traffic passing through the network protection device, to determine whether attack behavior such as an intrusion attack or malicious communication exists in a network, and if the attack behavior exists, blocks the attack behavior in a timely manner to ensure network security.

Currently, the network protection device performs network attack detection and protection by using an intrusion prevention system (IPS) technology or an anti-virus (AV) technology. For example, the IPS technology is mainly used to detect malicious traffic (or referred to as attack traffic), and the AV technology is mainly used to detect malicious files. A method for performing network attack detection by using the IPS technology and a method for performing network attack detection by using the AV technology are similar, and include: Attack signatures that are of a large quantity of known malicious traffic or malicious files and that are extracted by a network security solution provider are pre-stored in a signature database of the network protection device; and the network protection device extracts key content of traffic or a file that arrives at the network protection device, then compares the extracted key content with the attack signature that is pre-stored in the signature database, and if the extracted key content includes the attack signature in the signature database, determines that the traffic or file is aggressive.

However, in the foregoing method, because the attack signature included in the signature database of the network protection device is extracted based on the known (or common) malicious traffic or malicious files, a detection effect for unknown malicious traffic or malicious files (or malicious traffic or malicious files obtained after signature distortion is performed based on the known malicious traffic or malicious files) is unsatisfactory. Consequently, network security may be seriously threatened.

SUMMARY

Embodiments of this application provide a network attack detection method and apparatus, so that network adaptability and a detection effect of a network protection device can be improved.

To achieve the foregoing objectives, the following technical solutions are used in embodiments of this application.

According to a first aspect, a network attack detection method is provided in an embodiment of this application and can be applied to an intrusion prevention system (IPS) to prevent malicious traffic (that is, prevent a malicious attack), and can also be applied to anti-virus (AV) to prevent malicious files (that is, prevent virus). The method includes: A network protection device obtains first key data from received first network traffic, and matches the first key data with an attack signature in a signature database to obtain a first matching result, where the first key data is data obtained from a specified field of a parsing result obtained after the network protection device performs protocol parsing on one or more packets included in the first network traffic, and the first matching result includes an attack signature included in both the first key data and the signature database; if the network protection device determines, based on the first matching result, that the first network traffic is aggressive, the network protection device obtains a target attack detection model based on the first network traffic, where the target attack detection model is used to identify one or more attack signatures, and the one or more attack signatures are different from the attack signature in the signature database; and then, the network protection device receives second network traffic, and the network protection device determines, based on the target attack detection model, whether the second network traffic is aggressive.

In this embodiment of this application, before the network protection device performs network attack detection, the network protection device pre-stores the signature database. The signature database includes a plurality of known attack signatures provided by a network security solution provider. After receiving the first network traffic, the network protection device first matches the first key data extracted from the first network traffic with the attack signature in the signature database, and determines, based on the matching result, whether the first network traffic is aggressive. If it is determined, based on the matching result with the signature database, that the first network traffic is aggressive, the first network traffic is used as a black sample used to train the target attack detection model, to obtain the target attack detection model. The target attack detection model can identify a new attack signature that is not included in the signature database, and the new attack signature may be closely related to actual network traffic in a network environment in which the network protection device is deployed. The network protection device detects, based on the target attack detection model obtained through training, subsequent traffic flowing through the network protection device. In this embodiment of this application, the target attack detection model is obtained in real time based on malicious traffic that continuously appears in an actual network environment in which the network protection device is located. The network protection device detects subsequent network traffic by using the target attack detection model, so that the network protection device has a specific detection capability for some malicious traffic that attempts to avoid detection by using a new variant. In this way, network adaptability and a detection effect of the network protection device are improved.

Optionally, the network protection device pre-stores an attack detection model, and the attack detection model is an attack detection model obtained by training a sample set (or a sample library) including a large quantity of known malicious traffic (including traffic that initiates a network attack by using a packet or traffic that carries a malicious file). In a process in which the network protection device detects network traffic, the network protection device updates the attack detection model. For example, if the first network traffic is aggressive, the network protection device adds the first network traffic to the sample set as a new black sample set, obtains the target attack detection model based on the updated sample set, and updates an attack detection model in a model library by using the target attack detection model, that is, replaces an existing attack detection model with the target attack detection model. For ease of description, in this embodiment of this application, an un-updated attack detection model is referred to as an original attack detection model. In this way, the original attack detection model is continuously replaced with a target attack detection model obtained through training based on a new sample set.

Optionally, that the network protection device matches the first key data with an attack signature in a signature database specifically includes: The network protection device determines whether the first key data includes the attack signature in the signature database. Specifically, the network protection device compares the first key data with each attack signature in the signature database, and if the first key data includes a specific attack signature in the signature database, the network protection device records the attack signature, to obtain the first matching result. The first matching result includes the matched attack signature, that is, the attack signature included in both the first key data and the signature database. The network protection device determines, based on the matched attack signature and an attack determining policy, whether the first network traffic is aggressive.

Further, according to the network attack detection method provided in this embodiment of this application, the network protection device matches key data of network traffic with the attack signature in the signature database, and determines, based on a matching result, whether the network traffic is aggressive. For aggressive network traffic (for example, the first network traffic), the network protection device performs localized attack detection model training (in other words, attack detection model training is performed on the network protection device) based on the aggressive network traffic. Compared with a conventional technology in which a large quantity of known malicious traffic is transmitted to the cloud for attack detection model training, in this embodiment of this application, the network traffic does not need to be transmitted to the cloud for training, so that it can be ensured that data privacy is not disclosed.

In a possible implementation, that the network protection device determines, based on the target attack detection model, whether the second network traffic is aggressive specifically includes: The network protection device obtains second key data from the second network traffic, inputs the second key data to the target attack detection model, and determines, based on output of the target attack detection model, whether the second network traffic is aggressive. The second key data is data obtained from a specified field of a parsing result obtained after the network protection device performs protocol parsing on the one or more packets included in the second network traffic.

Specifically, the second key data is input to the target attack detection model, and the network protection device infers the second key data by using the target attack detection model. The target attack detection model outputs an inference result, and the inference result is a result of detecting the second network traffic by using the target attack detection model; to be specific, the second network traffic is aggressive, or the second network traffic is not aggressive.

In this embodiment of this application, the foregoing process of determining, based on the target attack detection model, whether the second network traffic is aggressive corresponds to the foregoing process of training the target attack detection model. For example, if the target attack detection model is obtained based on a random forest algorithm, when determining, based on the target attack detection model, whether the second network traffic is aggressive, the network protection device determines, by using a corresponding random forest classifier, whether the second network traffic is aggressive.

In a possible implementation, the specified field is a hypertext transfer protocol (HTTP) payload of one or more packets included in the network traffic. Specifically, the first key data is data obtained from an HTTP payload field of a parsing result obtained after the network protection device performs application layer protocol parsing on the one or more packets included in the first network traffic, and the second key data is data obtained from an HTTP payload field of a parsing result obtained after the network protection device performs application layer protocol parsing on the one or more packets included in the second network traffic.

In a possible implementation, the specified field is an HTTP payload of one or more packets included in the network traffic. Specifically, the first key data is file data that is carried by the first network traffic and that is obtained after the network protection device performs application layer protocol parsing on the one or more packets included in the first network traffic and reassembles HTTP payload fields of parsing results, and the second key data is file data that is carried by the second network traffic and that is obtained after the network protection device performs application layer protocol parsing on the one or more packets included in the second network traffic and reassembles HTTP payload fields of parsing results.

In a possible implementation, before the network protection device inputs the second key data to the target attack detection model, and determines, based on the output of the target attack detection model, whether the second network traffic is aggressive, the network attack detection method provided in this embodiment of this application further includes: The network protection device matches the second key data with the attack signature in the signature database to obtain a second matching result, and determines, based on the second matching result, that the second network traffic is not aggressive. The second matching result includes an attack signature included in both the second key data and the signature database.

The network protection device matches the second key data with the attack signature in the signature database to obtain the second matching result, and if the second matching result is null, the network protection device determines that the second network traffic is not aggressive.

In this embodiment of this application, after receiving the second network traffic, the network protection device first detects the second network traffic for a first time by using a signature matching—based detection method. After the detection for the first time, if the network protection device determines that the second network traffic is not aggressive, the network protection device detects the second network traffic for a second time by using an attack detection model-based detection method, and determines, based on output of the attack detection model, whether the second network traffic is aggressive. In this way, the attack detection model is used as a supplement to the signature database, so that a detection effect of network attack detection can be improved to a specific extent, and whether malicious traffic exists in a network is more reliably detected.

In a possible implementation, the network attack detection method provided in this embodiment of this application further includes: When the network protection device determines, based on the target attack detection model, that the second network traffic is aggressive, the network protection device performs an action response for the second network traffic based on a first preset action. The first preset action is used by the network protection device to perform an action response for aggressive network traffic.

In a possible implementation, the first preset action includes block or alert.

When the first preset action is block, that the network protection device performs the action response for the second network traffic based on the first preset action includes: The network protection device stops sending the second network traffic to a next-hop device of the network protection device. In this way, the network protection device can prevent the second network traffic from flowing into the next-hop device of the network protection device from the network protection device, to further prevent the second network traffic from continuing to flow into another device in the network, so that a network attack can be prevented in a timely manner.

When the first preset action is alert, that the network protection device performs the action response for the second network traffic based on first preset action includes: The network protection device outputs alert information by using an output device, and receives an instruction returned for the alert information, where the instruction includes a first instruction and a second instruction; and when the instruction is the first instruction, the network protection device stops sending the second network traffic to the next-hop device of the network protection device; or when the instruction is the second instruction, the network protection device sends the second network traffic to the next-hop device of the network protection device. In this case, responding of the network protection device is an online responding manner. To be specific, after outputting the alert information, the network protection device waits for feedback (that is, the first instruction and the second instruction) of a user for the alert information, and then performs a corresponding action based on the feedback of the user.

Alternatively, when the first preset action is alert, the network protection device outputs alert information by using an output device, and stops sending the second network traffic to the next-hop device of the network protection device. Alternatively, the network protection device outputs alert information by using an output device, and sends the second network traffic to the next-hop device of the network protection device. In this case, responding of the network protection device is an offline responding manner. To be specific, after the network protection device outputs the alert information (the alert information is only used to notify a user), the network protection device does not need to wait for feedback of the user for the alert information, but performs responding in a timely manner based on a preset action.

In a possible implementation, the network attack detection method provided in this embodiment of this application further includes: When the network protection device determines, based on the target attack detection model, that the second network traffic is not aggressive, the network protection device performs an action response for the second network traffic based on a second preset action. The second preset action is used by the network protection device to perform an action response for non-aggressive network traffic.

In a possible implementation, the second preset action is allow. That the network protection device performs the action response for the second network traffic based on the second preset action specifically includes: The network protection device sends the second network traffic to the next-hop device of the network protection device.

In a possible implementation, a method used by the network protection device to obtain the target attack detection model based on the first network traffic specifically includes: The network protection device adds the first network traffic to a first sample set as a black sample, to obtain a second sample set; and the network protection device trains the second sample set based on a predetermined algorithm to obtain the target attack detection model. The first sample set includes at least one black sample.

Optionally, to improve accuracy of a machine learning (or artificial intelligence) algorithm, for example, for accuracy of clustering of different types of samples, the first sample set further includes at least one white sample.

Optionally, in this embodiment of this application, the predetermined algorithm is one of a machine learning algorithm or an artificial intelligence algorithm, for example, an algorithm such as a decision tree, a random forest, Bayes, a convolutional neural network (CNN), or a deep neural network (DNN).

When the predetermined algorithm is a random forest algorithm, a target attack detection model obtained through training based on the random forest algorithm is a random forest classifier. The random forest classifier is configured to classify a test sample, to be specific, determine whether the test sample is a black sample or a white sample. In this embodiment of this application, the test sample is network traffic, and the random forest classifier obtained through training is used to determine whether the network traffic is aggressive. It should be understood that a process of training the random forest classifier is a process of training a plurality of decision trees included in the random forest classifier.

In a possible implementation, the network attack detection method provided in this embodiment of this application further includes: If the network protection device determines, based on the first matching result, that the first network traffic is aggressive, the network protection device performs an action response for the first network traffic based on a first preset action.

In a possible implementation, the network attack detection method provided in this embodiment of this application further includes: If the network protection device determines, based on the first matching result, that the first network traffic is not aggressive, the network protection device determines, based on an original attack detection model, whether the first network traffic is aggressive. The original attack detection model is obtained by training the first sample set based on the predetermined algorithm.

When the first matching result is null, in other words, when the first key data does not include the attack signature in the signature database, the network protection device determines that the first network traffic is not aggressive.

According to a second aspect, a network attack detection apparatus is provided in an embodiment of this application, and includes a detection module, an analysis module, and a receiving module. The detection module is configured to: obtain first key data from first network traffic received by the receiving module, and match the first key data with an attack signature in a signature database to obtain a first matching result, where the first key data is data obtained from a specified field of a parsing result obtained after the detection module performs protocol parsing on one or more packets included in the first network traffic, and the first matching result includes an attack signature included in both the first key data and the signature database. The analysis module is configured to: if the detection module determines, based on the first matching result, that the first network traffic is aggressive, obtain a target attack detection model based on the first network traffic, where the target attack detection model is used to identify one or more attack signatures, and the one or more attack signatures are different from the attack signature in the signature database. The receiving module is configured to receive second network traffic. The determining module is configured to determine, based on the target attack detection model, whether the second network traffic is aggressive.

In a possible implementation, the detection module is specifically configured to: obtain second key data from the second network traffic, input the second key data to the target attack detection model, and determine, based on output of the target attack detection model, whether the second network traffic is aggressive. The second key data is data obtained from a specified field of a parsing result obtained after the detection module performs protocol parsing on one or more packets included in the second network traffic.

In a possible implementation, the specified field is an HTTP payload of one or more packets included in the network traffic. Specifically, the first key data is data obtained from an HTTP payload field of a parsing result obtained after the detection module performs application layer protocol parsing on the one or more packets included in the first network traffic, and the second key data is data obtained from an HI IP payload field of a parsing result obtained after the detection module performs application layer protocol parsing on the one or more packets included in the second network traffic.

In a possible implementation, the specified field is an HTTP payload of one or more packets included in the network traffic. Specifically, the first key data is file data that is carried by the first network traffic and that is obtained after the detection module performs application layer protocol parsing on the one or more packets included in the first network traffic and reassembles HTTP payload fields of parsing results, and the second key data is file data that is carried by the second network traffic and that is obtained after the detection module performs application layer protocol parsing on the one or more packets included in the second network traffic and reassembles HTTP payload fields of parsing results.

In a possible implementation, the detection module is further configured to: match the second key data with the attack signature in the signature database to obtain a second matching result, and determine, based on the second matching result, that the second network traffic is not aggressive. The second matching result includes an attack signature included in both the second key data and the signature database.

In a possible implementation, the network attack detection apparatus provided in this embodiment of this application further includes a processing module. The processing module is configured to: when the detection module determines, based on the target attack detection model, that the second network traffic is aggressive, perform an action response for the second network traffic based on a first preset action.

In a possible implementation, the first preset action includes block or alert.

In a possible implementation, the network attack detection apparatus provided in this embodiment of this application further includes a sending module.

When the first preset action is block, the processing module is specifically configured to control the sending module to stop sending the second network traffic to a next-hop device of a network protection device.

When the first preset action is alert, the processing module is specifically configured to: control the sending module to output alert information by using an output device, and control the receiving module to receive an instruction returned for the alert information, where the instruction includes a first instruction and a second instruction; and when the instruction is the first instruction, the sending module stops sending the second network traffic to a next-hop device of a network protection device; or when the instruction is the second instruction, the sending module sends the second network traffic to the next-hop device of the network protection device.

Alternatively, when the first preset action is block, the processing module is specifically configured to: control the sending module to output alert information by using an output device and stop sending the second network traffic to a next-hop device of a network protection device; or control the sending module to output alert information by using an output device and send the second network traffic to a next-hop device of a network protection device.

In a possible implementation, the processing module is further configured to: when the detection module determines, based on the target attack detection model, that the second network traffic is not aggressive, perform an action response for the second network traffic based on a second preset action.

In a possible implementation, the second preset action is allow. The processing module is specifically configured to send the second network traffic to the next-hop device of the network protection device.

In a possible implementation, the analysis module is specifically configured to: add the first network traffic to a first sample set as a black sample, to obtain a second sample set, where the first sample set includes at least one black sample; and train the second sample set based on a predetermined algorithm to obtain the target attack detection model.

In a possible implementation, the detection module is further configured to: when it is determined, based on the first matching result, that the first network traffic is aggressive, perform an action response for the first network traffic based on a first preset action.

In a possible implementation, the detection module is further configured to: when it is determined, based on the first matching result, that the first network traffic is not aggressive, determine, based on an original attack detection model, whether the first network traffic is aggressive, where the original attack detection model is obtained by training the first sample set based on the predetermined algorithm.

According to a third aspect, a network protection device is provided in an embodiment of this application, and includes a memory and at least one processor connected to the memory. The memory is configured to store instructions. After the instructions are read by the at least one processor, the network protection device performs the method in the first aspect or any possible implementation of the first aspect. For details, refer to the foregoing detailed descriptions. Details are not described herein again.

According to a fourth aspect, a computer-readable storage medium is provided in an embodiment of this application, and is configured to store computer software instructions used by the foregoing network protection device, and the computer readable storage medium includes a program designed to perform the first aspect or any possible implementation of the foregoing first aspect.

According to a fifth aspect, an embodiment of this application provides a computer program product including instructions. When the computer program product runs on a computer, the computer is enabled to perform the method in the first aspect or any possible implementation of the first aspect.

According to a sixth aspect, an embodiment of this application provides a chip, including a memory and a processor. The memory is configured to store computer instructions. The processor is configured to invoke the computer instructions from the memory and run the computer instructions, to perform the method in the first aspect and any possible implementation of the first aspect.

DETAILED DESCRIPTION OF ILLUSTRATIVE EMBODIMENTS

Figure 1:
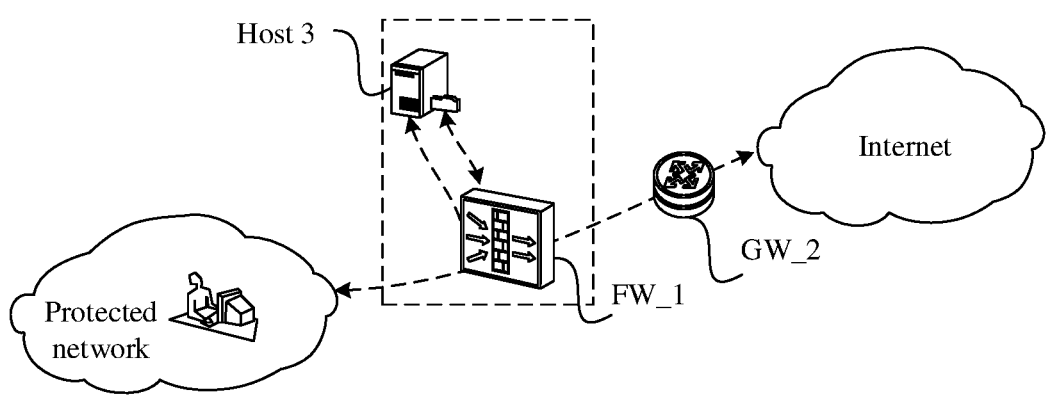
FIG. 1 is a schematic diagram of an application scenario of a network attack detection method according to an embodiment of this application.

In this specification, the term "and/or" is merely an association relationship that describes associated objects, and represents that there are three relationships. For example, A and/or B represents three cases: only A exists, both A and B exist, and only B exists.

In the specification and claims in embodiments of this application, the terms "first", "second", and so on are intended to distinguish between different objects but do not indicate a particular order of the objects. For example, first network traffic, second network traffic, and the like are used to distinguish different network traffic instead of being used to describe a specific sequence of network traffic, and first key data, second key data, and the like are used to distinguish between different key data instead of being used to describe a specific sequence of key data.

In the description of embodiments of this application, unless otherwise stated, "a plurality of" means two or more than two. For example, a plurality of processing units refer to two or more processing units; and a plurality of systems refer to two or more systems.

First, some concepts involved in a network attack detection method and apparatus provided in embodiments of this application are described.

A network protection device is used for network security protection. The network protection device can detect and defend against a network attack, virus, and the like, to ensure secure data transmission. For example, a firewall and a security gateway device (such as a router or a switch) are network protection devices. The firewall is deployed at a boundary of a protected network, and is configured to: filter data streams that flow into and out of the protected network, manage access behavior of flowing into and out of the network, and detect a network attack and send alert. The firewall is mainly configured to protect the protected network from an external attack. The security gateway device not only has a function of the firewall, but also has functions of network intrusion prevention, anti-virus, and the like. Specifically, the network protection device detects traffic passing through the network protection device, to determine whether attack behavior such as an intrusion attack or malicious communication exists in the network, and if the attack behavior exists, blocks the attack behavior in a timely manner to ensure security of the protected network.

Based on a problem existing in a conventional technology, a network attack detection method and apparatus are provided in embodiments of this application. A network protection device obtains first key data from first network traffic received by the network protection device, and determines, based on an attack signature in a signature database, whether the first network traffic is aggressive. If the network protection device determines that the first network traffic is aggressive, the network protection device obtains a target attack detection model based on the first network traffic, where the target attack detection model is used to identify one or more attack signatures, and the one or more attack signatures are different from the attack signature in the signature database. Further, when the network protection device receives second network traffic, the network protection device determines, based on the target attack detection model, whether the second network traffic is aggressive. According to the technical solution provided in this embodiment of this application, the target attack detection model is dynamically obtained based on malicious traffic that continuously appears in an actual network environment in which the network protection device is located, and the target attack detection model has a capability of identifying an attack signature that is not included in the signature database. In other words, the target attack detection model is used, so that the attack signature that is not included in the signature database in the actual network environment in which the network protection device is located can be learned based on a local condition. The network protection device detects subsequent network traffic by using the target attack detection model, so that the network protection device has a specific detection capability for some malicious traffic that attempts to avoid detection by using a new variant. In this way, network adaptability and a detection effect of the network protection device can be improved.

Specific functions of the network attack detection method provided in embodiments of this application include but are not limited to: operating system vulnerability exploit detection (such as SMB service vulnerability detection, Apache vulnerability detection, or Struts2 component vulnerability detection), application software vulnerability detection, Web application intrusion detection (such as SQL injection detection or XSS cross-station attack detection), and command and control server communication (that is, C & C communication) detection (such as detection of malicious traffic such as zombie, Trojan, and worms).

For example, FIG. 1 is a schematic diagram of an application scenario of a network attack detection method according to an embodiment of this application. In a network shown in FIG. 1, a network protection device is a firewall (FW_1) or a security gateway device (GW_2). The firewall or the security gateway device is located on a transmission path of network traffic (a bidirectional data stream) between a protected network and an internet. With reference to FIG. 1, in this embodiment of this application, an analysis device (a host 3) is configured to perform attack detection model training based on a training sample (for example, a sample set in this embodiment of this application), and the firewall (FW_1) is configured to detect whether network traffic is aggressive. Optionally, the analysis device and the firewall (the network protection device) are integrated into a same physical device. Alternatively, the analysis device and the firewall are implemented by different physical devices that have mutual communication coupling. This is not limited in this embodiment of this application.

Figure 2A:
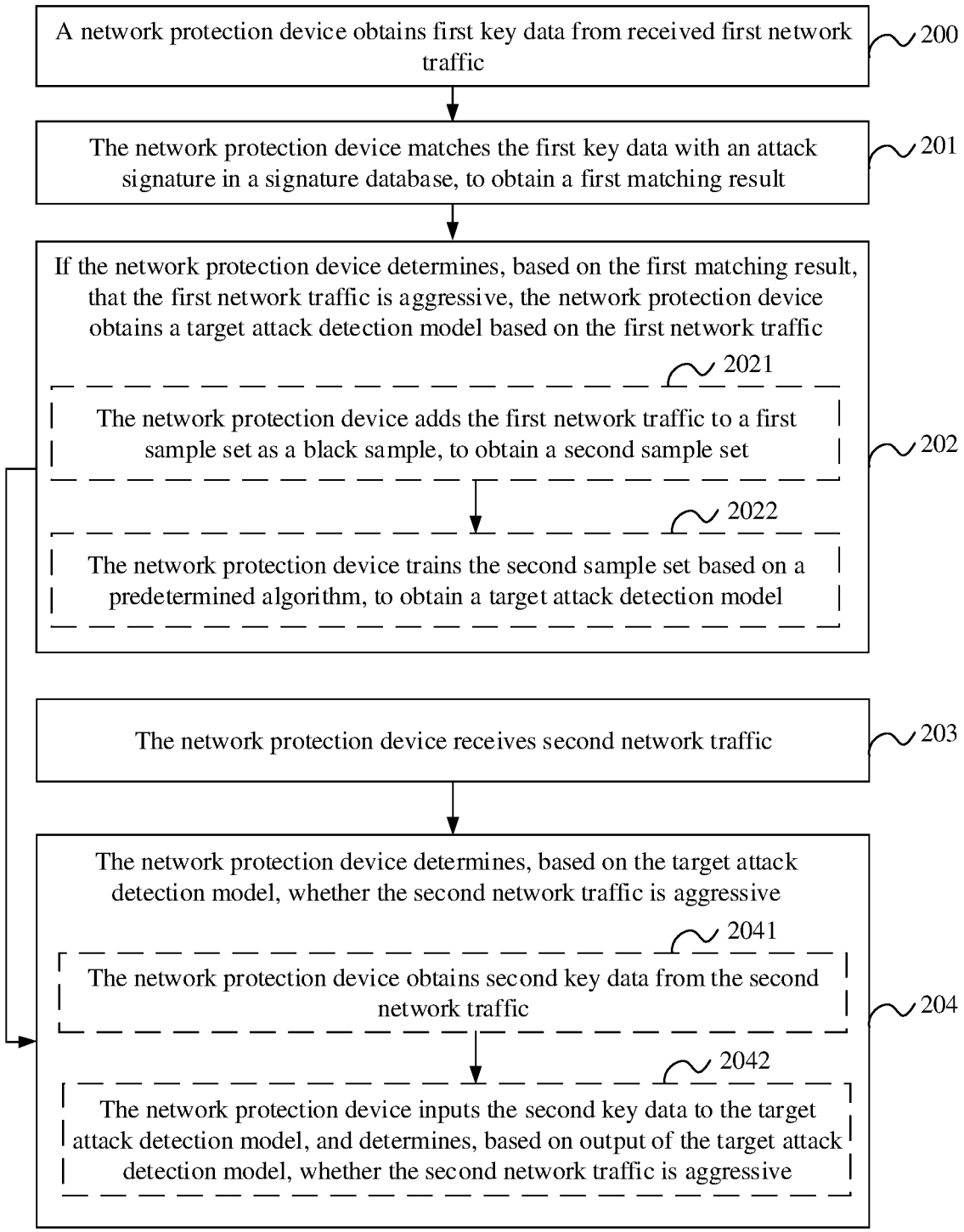
FIG. 2A is a schematic diagram 1 of a network attack detection method according to an embodiment of this application.

The network attack detection method provided in this embodiment of this application may be applied to an intrusion prevention system (IPS) to prevent malicious traffic (that is, defend against a malicious attack), and may also be applied to anti-virus (AV) to prevent a malicious file (that is, defend against virus). As shown in FIG. 2A, the network attack detection method provided in this embodiment of this application includes step 200 to step 204.

Figure 2B:
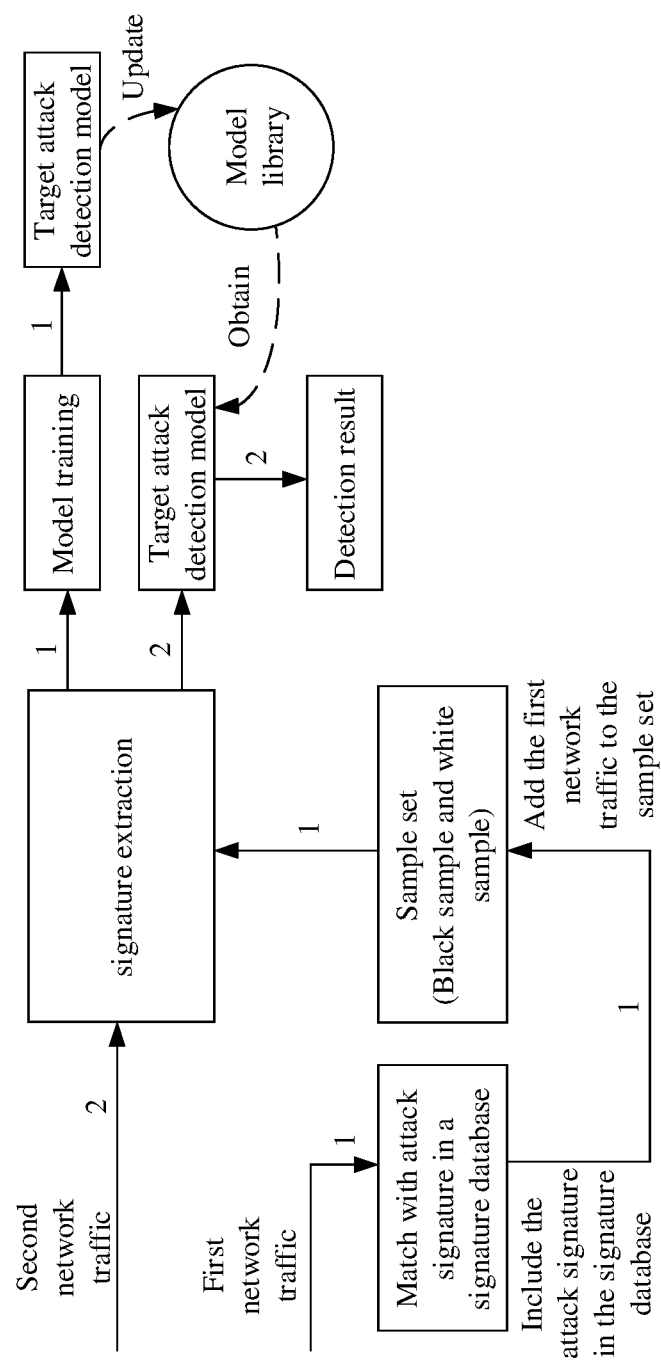
FIG. 2B is a schematic flowchart of a network attack detection method according to an embodiment of this application.
Figure 2C:
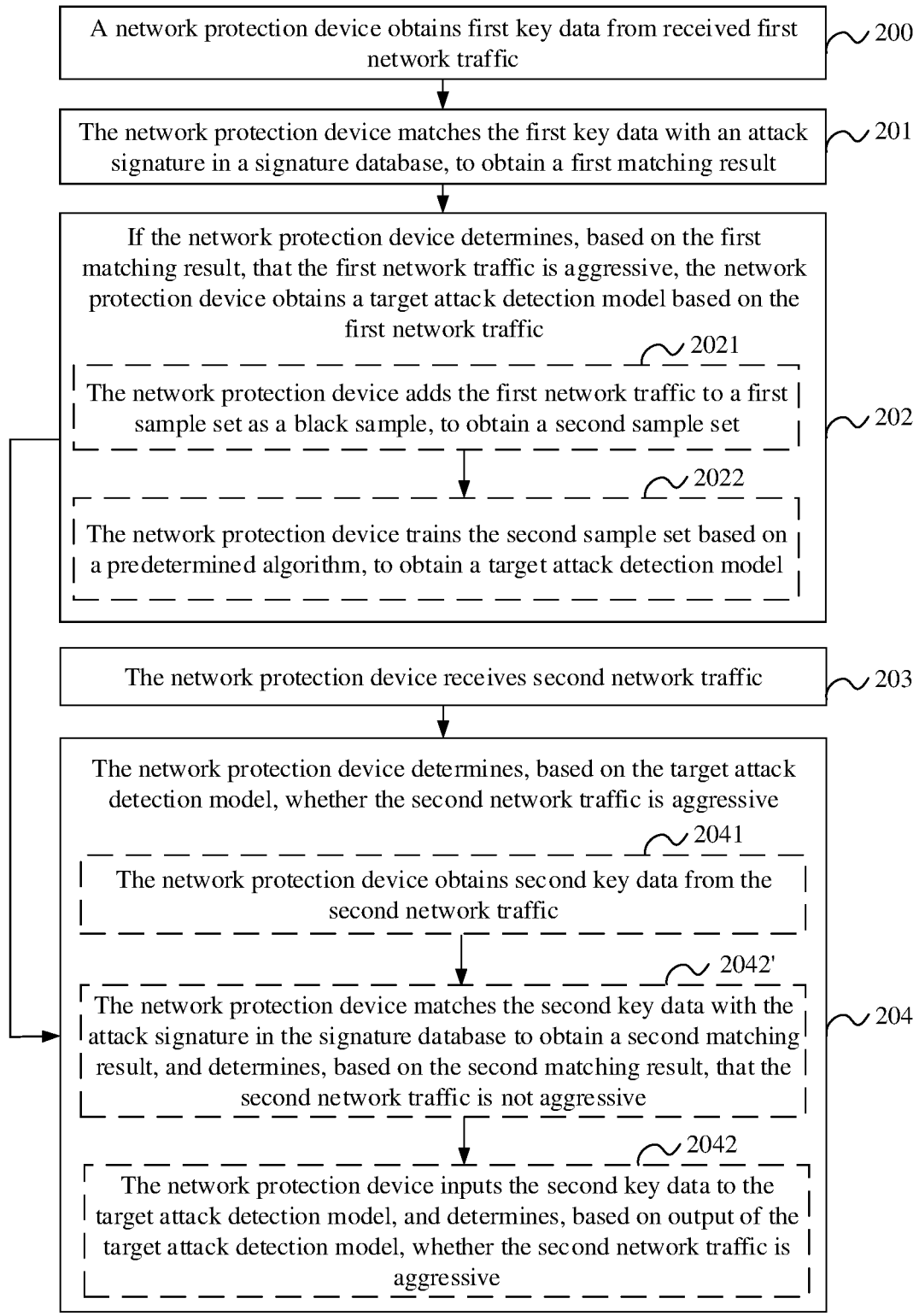
FIG. 2C is a schematic diagram 2 of a network attack detection method according to an embodiment of this application.
Figure 2D:
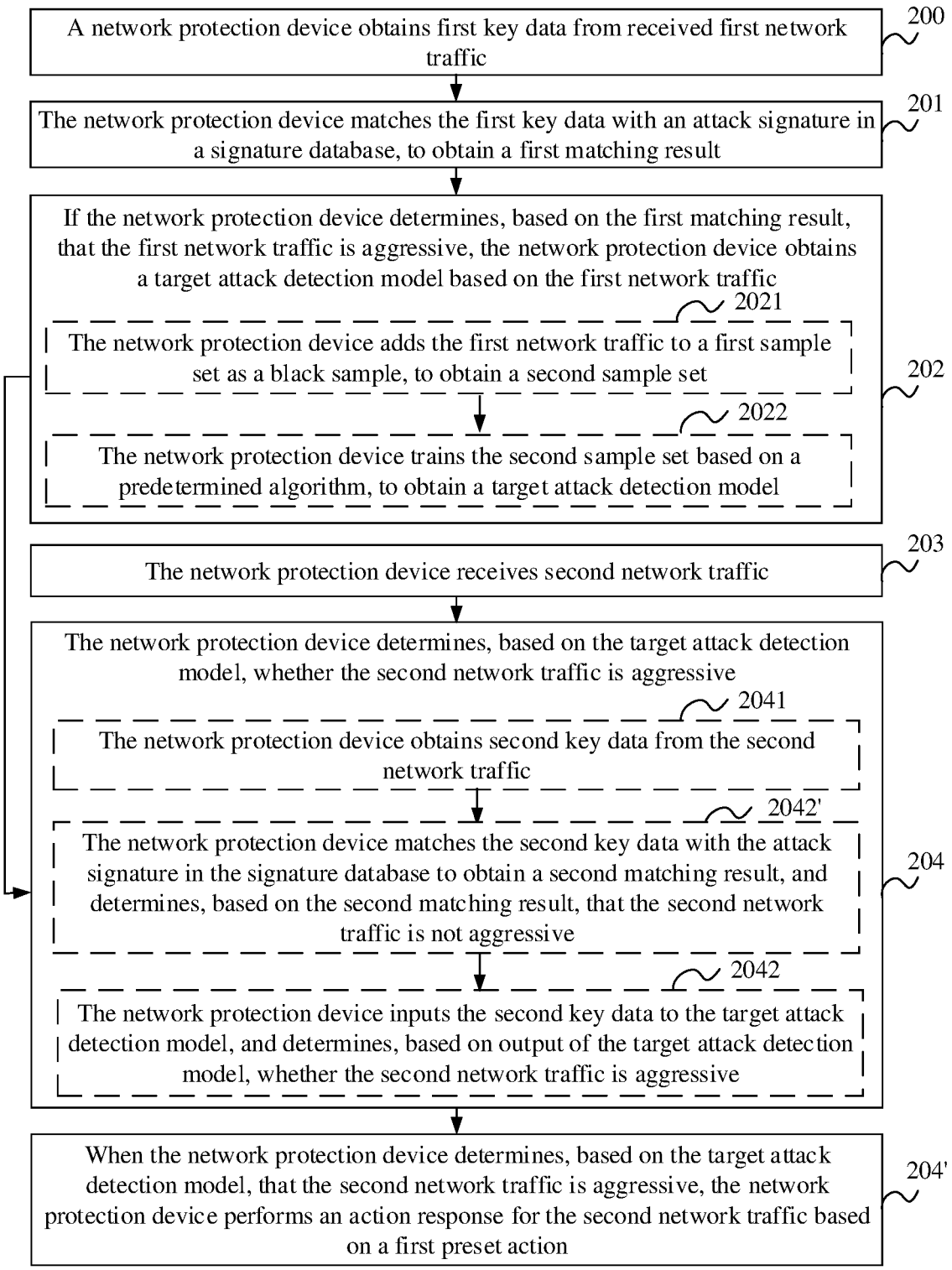
FIG. 2D is a schematic diagram 3 of a network attack detection method according to an embodiment of this application.
Figure 2E:
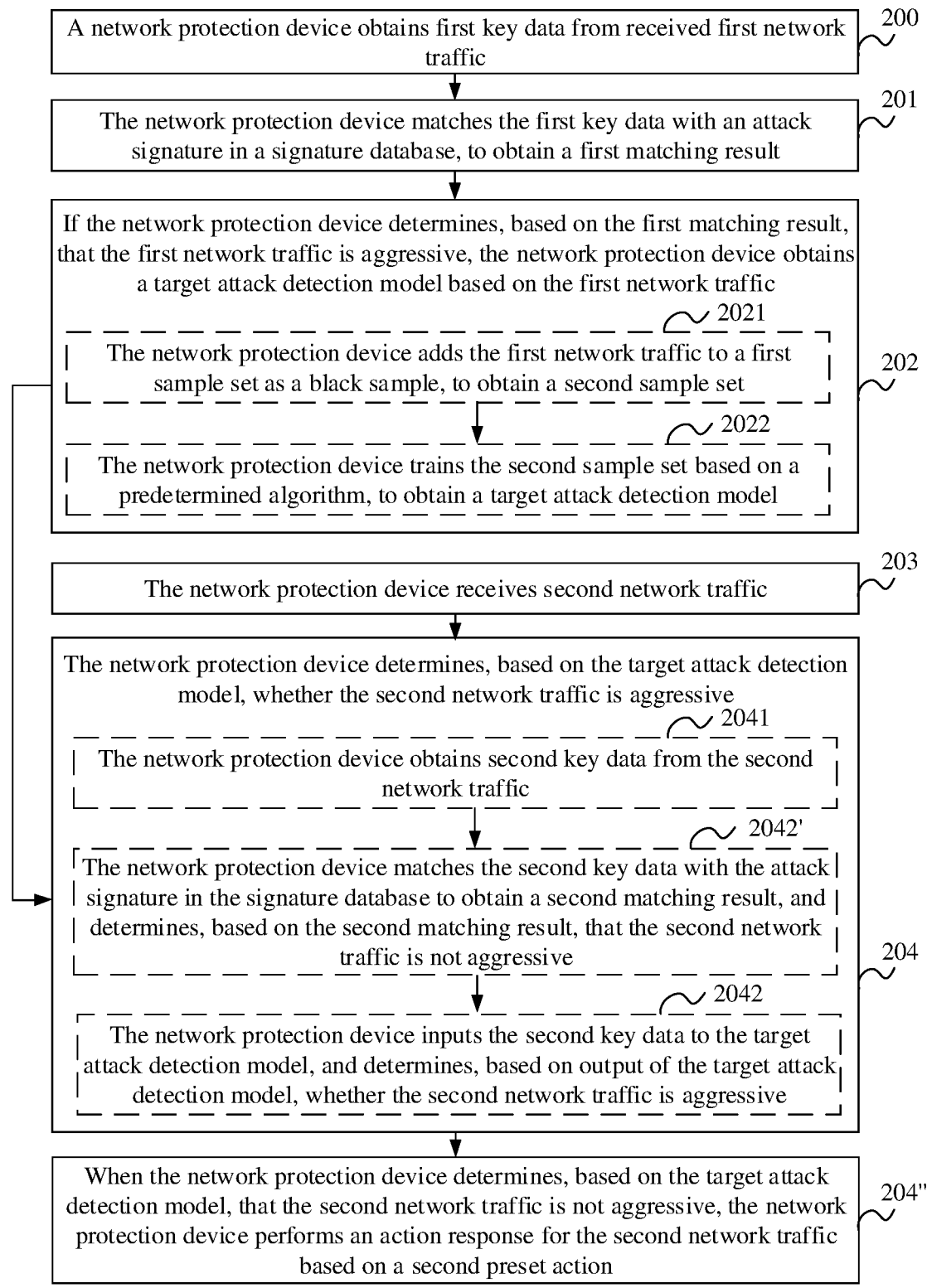
FIG. 2E is a schematic diagram 4 of a network attack detection method according to an embodiment of this application.
Figure 2F:
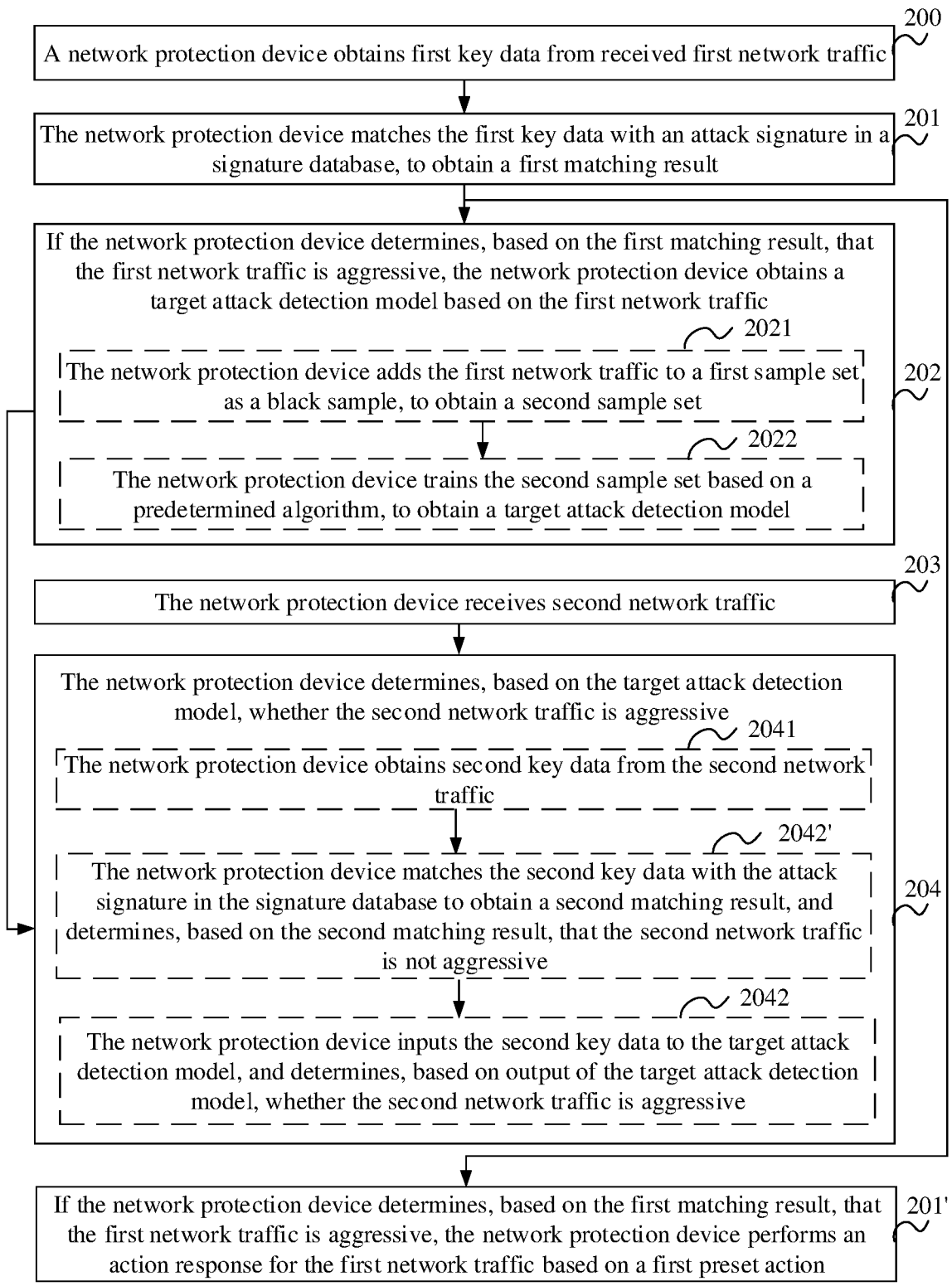
FIG. 2F is a schematic diagram 5 of a network attack detection method according to an embodiment of this application.

When the analysis device (for example, the host 3 in FIG. 1) is integrated with the network protection device (for example, the firewall in FIG. 1), the network protection device performs step 201 to step 204, step 2021, step 2022, step 2041, and step 2042 shown in FIG. 2A, FIG. 2C, FIG. 2D, FIG. 2E, and FIG. 2F, step 2042' shown in FIG. 2C, step 204' shown in FIG. 2D, step 204" shown in FIG. 2E, and step 201' shown in FIG. 2F. When the analysis device and the network protection device are implemented by different physical devices, the analysis device performs step 202, step 2021, and step 2022 shown in FIG. 2A, FIG. 2C, FIG. 2D, FIG. 2E, and FIG. 2F, and the network protection device performs step 200, step 201, step 203, step 204, step 2041, and step 2042 in FIG. 2A, step 2042' shown in FIG. 2C, step 204' shown in FIG. 2D, step 204" shown in FIG. 2E, and step 201' shown in FIG. 2F. In the following embodiments, the provided network attack detection method is described by using an implementation in which the analysis device and the network protection device are integrated into a same physical device (that is, the network protection device) as an example.

Step 200: The network protection device obtains first key data from received first network traffic.

Optionally, in the scenario shown in FIG. 1, the first network traffic is traffic that is between the protected network and the internet and that flows through the firewall (FW_1). The first key data is data obtained from a specified field of a parsing result obtained after the network protection device performs protocol parsing on one or more packets included in the first network traffic.

When the network attack detection method provided in this embodiment of this application is used for intrusion prevention, an object detected by the network protection device is network traffic (to be specific, one or more packets included in the network traffic, or one or more sessions with same quintuple information, where one session includes a plurality of packets). When the network attack detection method provided in this embodiment of this application is used for anti-virus, an object detected by the network protection device is a file carried by network traffic.

It should be understood that the network traffic includes several packets. After receiving the first network traffic, the network protection device buffers a packet included in the first network traffic, parses the one or more packets included in the first network traffic, and obtains the first key data from the specified field of the parsing result.

Optionally, if the network protection device is used for intrusion prevention, and the specified field is a hypertext transport protocol HTTP payload of the one or more packets included in the first network traffic, the first key data is data obtained from the HTTP payload field of the parsing result obtained after the network protection device performs application layer protocol parsing on the one or more packets included in the first network traffic. Alternatively, if the network prevention device is used for anti-virus, and the first key data is file data that is carried by the first network traffic and that is obtained after the network protection device performs application layer protocol parsing on the one or more packets included in the first network traffic and reassembles HI IP payload fields of parsing results.

For example, the first network traffic is SQL injection attack traffic. The first key data is data obtained from an HTTP payload field of a parsing result obtained after the network protection device performs application layer protocol parsing on the packet included in the attack traffic. The data is a uniform resource locator (URL), and the URL (that is, the first key data) is:

GET /index.php?id=123 or 1=1 and (select top 1 password from [admin]).

In an implementation, when the first network traffic includes a plurality of packets, the first key data is data obtained from a specified field of a parsing result obtained after the network protection device performs protocol parsing on one of the plurality of packets included in the first network traffic; or the first key data is data obtained from a specified field of a parsing result obtained after the network protection device performs protocol parsing on at least two packets in the plurality of packets included in the first network traffic; in other words, the first key data is a combination of data in specified fields of respective parsing results of at least two packets in the plurality of packets included in the first network traffic. This is not limited in this embodiment of this application.

Step 201: The network protection device matches the first key data with an attack signature in a signature database, to obtain a first matching result.

In this embodiment of this application, the signature database includes a plurality of attack signatures. The plurality of attack signatures are attack signatures that are of a large quantity of known malicious traffic or malicious files and that are extracted by a network security solution provider, and are pre-stored (loaded) in the network protection device.

In an implementation, that the network protection device matches the first key data with an attack signature in a signature database specifically includes: The network protection device determines whether the first key data includes the attack signature in the signature database. Specifically, the network protection device compares the first key data with each attack signature in the signature database, and if the first key data includes a specific attack signature in the signature database, the network protection device records the attack signature, to obtain the first matching result. The first matching result includes the matched attack signature, that is, an attack signature included in both the first key data and the signature database. The network protection device determines, based on the matched attack signature and an attack determining policy, whether the first network traffic is aggressive. There are a plurality of attack determining policies, and it is difficult to enumerate the attack determining policies one by one herein. Only two examples are used for description. For example, when a quantity of matched attack signatures exceeds a specified threshold, the network protection device determines that the first network traffic is aggressive; or when a sequence including matched attack signatures meets a predetermined matching rule, the network protection device determines that the first network traffic is aggressive. The attack determining policy further includes a policy defined from dimensions such as similarity, probability, and regularity. The attack determining policy is specifically selected based on an actual requirement. This is not limited in this embodiment of this application.

If the first matching result is null, in other words, when the first key data does not include the attack signature in the signature database, the network protection device determines that the first network traffic is not aggressive (in other words, the first network traffic is not aggressive).

In the foregoing embodiment, a method in which the network protection device matches the first key data with the attack signature in the signature database and determines, based on the first matching result, whether the first network traffic is aggressive is referred to as a signature matching-based detection method.

For simplicity of description, in this embodiment, a simplest attack determining policy is used. To be specific, when a quantity of matched attack signatures is greater than or equal to 1, the network protection device determines that the first network traffic is aggressive.

With reference to the foregoing example, the first key data is the foregoing URL obtained through parsing:

GET /index.php?id=123 or 1=1 and (select top 1 password from [admin]).

The network protection device matches the first key data with the attack signature in the signature database. It is assumed that the attack signature in the signature database is "1=1" (certainly, the signature database may further include another attack signature). It can be learned that the first key data includes the attack signature "1=1" in the signature database, and therefore, the network protection device determines that the first network traffic is aggressive.

Step 202: If the network protection device determines, based on the first matching result, that the first network traffic is aggressive, the network protection device obtains a target attack detection model based on the first network traffic.

The target attack detection model is used to detect whether network traffic subsequently received by the network protection device is aggressive. The target attack detection model is used to identify one or more attack signatures, and the one or more attack signatures are different from the attack signature in the signature database.

With reference to the foregoing example, it is assumed that the target attack detection model obtained based on the first network traffic is used to identify attack signatures "select", "top", "password", and "admin". In other words, based on the target attack detection model, the network protection device can determine that network traffic that has the foregoing signatures "select", "top", "password", and "admin" is aggressive.

In this embodiment of this application, before the network protection device performs network attack detection, the network protection device pre-stores the signature database and a model library. The signature database is the signature database including a plurality of attack signatures in the foregoing embodiment, and the model library stores an attack detection model. The attack detection model in the model library is an attack detection model obtained by training a sample set including a large quantity of known malicious traffic (including traffic that initiates a network attack by using a packet or traffic that carries a malicious file). In a process in which the network protection device detects network traffic, the network protection device updates the attack detection model. For example, if the first network traffic is aggressive, the network protection device adds the first network traffic to the sample set as a new black sample set, obtains the target attack detection model based on the updated sample set, and updates the attack detection model in the model library by using the target attack detection model, that is, replaces the existing attack detection model with the target attack detection model. For ease of description, in this embodiment of this application, an un-updated attack detection model is referred to as an original attack detection model. In this way, the original attack detection model is continuously replaced with a target attack detection model obtained through training based on a new sample set.

It should be understood that the attack detection model in the model library is pre-stored (loaded) in the network protection device. The attack detection model is an attack detection model obtained by the network security solution provider by training a large quantity of known malicious traffic or malicious files. For a specific method for obtaining the attack detection model by training a large quantity of known malicious traffic or malicious files, refer to related content in a conventional technology. Details are not described herein.

In this embodiment of this application, it may be learned from the descriptions in step 201 that when the first key data includes the attack signature in the signature database, the network protection device determines that the first network traffic is aggressive. In this case, the network protection device obtains the target attack detection model based on the first network traffic.

Optionally, as shown in FIG. 2A, the network protection device obtains the target attack detection model by using step 2021 and step 2022.

Step 2021: The network protection device adds the first network traffic to a first sample set as a black sample, to obtain a second sample set.

The first sample set includes at least one black sample. Optionally, to improve accuracy of a machine learning (or artificial intelligence) algorithm, for example, for accuracy of clustering of different types of samples, the first sample set further includes at least one white sample. The first sample set is a sample set corresponding to the original attack detection model. In other words, the original attack detection model is obtained based on training of the first sample set.

Step 2022: The network protection device trains the second sample set based on a predetermined algorithm, to obtain the target attack detection model.

Optionally, in this embodiment of this application, the predetermined algorithm is one of a machine learning algorithm or an artificial intelligence algorithm, for example, an algorithm such as a decision tree, a random forest, Bayes, a CNN, or a DNN.

For example, the predetermined algorithm is a random forest algorithm, and a target attack detection model obtained by the network protection device through training based on the random forest algorithm is a random forest classifier. The random forest classifier is configured to classify a test sample, to be specific, determine whether the test sample is a black sample or a white sample. In this embodiment of this application, the test sample is unclassified network traffic, and the random forest classifier obtained through training is used to determine whether the network traffic is aggressive. It should be understood that a process of training the random forest classifier is a process of training a plurality of decision trees included in the random forest classifier.

A process of training the target attack detection model (the random forest classifier) based on the random forest algorithm is briefly described below.

S1: Extract a multi-dimensional signature of each sample in the second sample set.

Optionally, a signature of the sample is extracted by using a term frequency—inverse document frequency (TF-IDF) technology. Alternatively, a signature of the sample is extracted by using another signature extraction technology. This is not limited in this embodiment of this application.

S2: For each of the plurality of decision trees included in the random forest classifier, randomly extract, with replacement, a plurality of samples from the second sample set as a training set of the decision tree.

S3: Train a decision tree based on multi-dimensional signatures corresponding to a plurality of samples included in a training set of each decision tree.

For a process of training the decision tree, refer to related content in a conventional technology. Details are not described herein.

After the random forest classifier is obtained through training, a to-be-predicted sample (for example, second network traffic in the following embodiments) may be subsequently predicted based on the random forest classifier. A specific process is described in the following embodiments.

Step 203: The network protection device receives second network traffic.

Step 204: The network protection device determines, based on the target attack detection model, whether the second network traffic is aggressive.

Optionally, as shown in FIG. 2A, the network protection device determines, by using step 2041 and step 2042, whether the second network traffic is aggressive.

Step 2041: The network protection device obtains second key data from the second network traffic.

The second key data is data obtained from a specified field of a parsing result obtained after the network protection device performs protocol parsing on one or more packets included in the second network traffic.

Similar to the first key data, the second key data is data obtained from an HTTP payload field of a parsing result obtained after the network protection device performs application layer protocol parsing on the one or more packets included in the second network traffic; or the second key data is file data that is carried by the second network traffic and that is obtained after the network protection device performs application layer protocol parsing on the one or more packets included in the second network traffic and reassembles HTTP payload fields of parsing results.

For example, the second network traffic is SQL injection attack traffic. The second key data is data obtained from an HTTP payload field of a parsing result obtained after the network protection device performs application layer protocol parsing on the packet included in the second network traffic. The data is a URL, and the URL (that is, the second key data) is:

GET /index.php?id=123 or (IF((USER( )LIKE 'ro%'),1, o))=1 and (select top 1 password from [admin]).

Step 2042: The network protection device inputs the second key data to the target attack detection model, and determines, based on output of the target attack detection model, whether the second network traffic is aggressive.

Specifically, the second key data is input to the target attack detection model, and the network protection device infers the second key data by using the target attack detection model. The target attack detection model outputs an inference result, and the inference result is a result of detecting the second network traffic by using the target attack detection model; to be specific, the second network traffic is aggressive, or the second network traffic is not aggressive.

It should be noted that in this embodiment of this application, the foregoing process of determining, based on the target attack detection model, whether the second network traffic is aggressive corresponds to the foregoing process of training the target attack detection model. For example, if the target attack detection model is obtained based on the random forest algorithm, when determining, based on the target attack detection model, whether the second network traffic is aggressive, the network protection device determines, by using a corresponding random forest classifier, whether the second network traffic is aggressive.

For example, it is assumed that the target attack detection model is the random forest classifier obtained through training. After obtaining the second key data from the second network traffic, the network protection device extracts a multi-dimensional signature from the second key data (similar to the foregoing method for extracting the multi-dimensional signature of each sample in the second sample set), and then uses the multi-dimensional signature of the second key data as input of the random forest classifier, and the random forest classifier outputs a prediction result of the second network traffic, that is, whether the second network traffic is aggressive. It should be understood that an output result of the random forest classifier is a result of voting on output of the plurality of decision trees included in the random forest classifier.

In the foregoing embodiment, that the network protection device inputs the second key data to the target attack detection model, and determines, based on the output of the target attack detection model, whether the second network traffic is aggressive is referred to as an attack detection model—based detection method.

FIG. 2B is a schematic flowchart of implementing network attack detection by using a network attack detection method according to an embodiment of this application. Refer to FIG. 2B for further understanding of the steps described in the foregoing embodiment. A processing procedure indicated by a label "1" in FIG. 2B is a procedure in which the network protection device processes the received first network traffic, and a processing procedure indicated by a label "2" in FIG. 2B is a procedure in which the network protection device processes the received second network traffic.

As shown in FIG. 2B, after receiving the first network traffic, the network protection device first matches the first key data extracted from the first network traffic with the attack signature in the signature database. If it is determined, based on the matching result with the signature database, that the first network traffic is aggressive, the first network traffic is used as a black sample used to train the target attack detection model, and is added to the sample set. Then, signatures of all samples in the sample set are extracted, and the extracted signature is used for model training, to obtain the target attack detection model, and the attack detection model in the model library is updated to the target attack detection model. When the network protection device receives the second network traffic, the network protection device performs signature extraction on the second network traffic (similar to the foregoing method for performing signature extraction on the sample in the sample set). Then, the extracted signature is used as input of the target attack detection model (a latest attack detection model obtained from the model library, that is, the target attack detection model obtained based on the first network traffic), and a detection result (that is, whether the second network traffic is aggressive) is determined based on output of the target attack detection model.

According to the network attack detection method provided in this embodiment of this application, the network protection device obtains the first key data from the first network traffic received by the network protection device (the first key data is data obtained from the specified field of the parsing result obtained protocol parsing is performed on the one or more packets included in the first network traffic), and matches the first key data with the attack signature in the signature database to obtain a matching result, where the matching result includes the attack signature included in both the first key data and the signature database. If the network protection device determines, based on the matching result, that the first network traffic is aggressive, the network protection device obtains the target attack detection model based on the first network traffic. The target attack detection model is used to identify one or more attack signatures, and the one or more attack signatures are different from the attack signature in the signature database. Further, when the network protection device receives the second network traffic, the network protection device determines, based on the target attack detection model, whether the second network traffic is aggressive. Because the target attack detection model is obtained in real time based on malicious traffic that continuously appears in the actual network environment in which the network protection device is located, and the target attack detection model can identify more attack signatures that are not included in the signature database, if the network protection device detects subsequent network traffic by using the target attack detection model, the network protection device has a specific detection capability for some malicious traffic that attempts to avoid detection by using a new variant. In this way, network adaptability and a detection effect of the network protection device are improved.

Further, according to the network attack detection method provided in this embodiment of this application, the network protection device matches key data of network traffic with the attack signature in the signature database, and determines, based on a matching result, whether the network traffic is aggressive. For aggressive network traffic (for example, the first network traffic), the network protection device performs localized attack detection model training (in other words, attack detection model training is performed on the network protection device) based on the aggressive network traffic. Compared with a conventional technology in which a large quantity of known malicious traffic is transmitted to the cloud for attack detection model training, in this embodiment of this application, the network traffic does not need to be transmitted to the cloud for training, so that it can be ensured that data privacy is not disclosed.

Optionally, with reference to FIG. 2A, as shown in FIG. 2C, before step 2042 (that is, the network protection device inputs the second key data to the target attack detection model, and determines, based on output of the target attack detection model, whether the second network traffic is aggressive), the network attack detection method provided in this embodiment of this application further includes step 2042'.

Step 2042': The network protection device matches the second key data with the attack signature in the signature database to obtain a second matching result, and determines, based on the second matching result, that the second network traffic is not aggressive.

The network protection device matches the second key data with the attack signature in the signature database to obtain the second matching result, and if the second matching result is null, the network protection device determines that the second network traffic is not aggressive.

The second key data is data obtained from a specified field of a parsing result obtained after the network protection device performs protocol parsing on one or more packets included in the second network traffic. For details, refer to related descriptions in the foregoing embodiment. In this embodiment of this application, a process of matching the second key data with the attack signature in the signature database is similar to the process of matching the first key data with the attack signature in the signature database in step 201. Therefore, for detailed descriptions of step 2042', refer to related descriptions of step 201 in the foregoing embodiment. Details are not described herein again.

It can be learned from the descriptions in the foregoing embodiment that, after receiving the second network traffic, the network protection device first detects the second network traffic for a first time based on a signature matching—based detection method in step 2042'. After the detection for the first time, if the network protection device determines that the second network traffic is not aggressive, the network protection device detects the second network traffic for a second time by using an attack detection model-based detection method in step 2042, and determines, based on the output of the attack detection model, whether the second network traffic is aggressive. In this way, the attack detection model is used as a supplement to the signature database, so that a detection effect of network attack detection can be improved to a specific extent, and whether malicious traffic exists in a network is more reliably detected.

For example, the second network traffic is SQL injection attack traffic. The second key data is a URL obtained through parsing from the second network traffic:

GET /index.php?id=123 or (IF((USER( )LIKE 'ro%'),1, o))=1 and (select top 1 password from [admin]).

First, the network protection device matches the second key data with the attack signature in the signature database. It is assumed that the attack signature in the signature database is "1=1" (certainly, the signature database may further include another attack signature). It can be learned that the second key data does not include "1=1" in the signature database (the second key data does not include another attack signature in the signature database). Then, the network protection device detects the second network traffic based on the target attack detection model. With reference to the foregoing example, because the target attack detection model obtained based on the first network traffic can be used to identify attack signatures "select", "top", "password", and "admin", the network protection device determines, based on the target attack detection model, that the second network traffic is aggressive.

In this embodiment of this application, the signature database includes one or more attack signatures, and the one or more attack signatures are referred to as a first attack signature. The target attack detection model can be used to identify one or more attack signatures, and the one or more attack signatures are referred to as a second attack signature. It can be learned with reference to the descriptions in the foregoing embodiment that the first attack signature is different from the second attack signature, and in a process in which the network protection device transmits a packet including the first attack signature, the first attack signature is easily tampered with (for example, undergoes variation such as changing of a name or code). In a process in which the network protection device transmits a packet including the second attack signature, the second attack signature is not easily tampered with.

For example, the first network traffic and the second network traffic are used as examples, and the first key data obtained from the first network traffic is:

GET /index.php?id=123 or 1=1 and (select top 1 password from [admin]).

A second key data obtained from the second network traffic is:

GET /index.php?id=123 or (IF((USER( ) LIKE 'ro%'),1, o))=1 and (select top 1 password from [admin]).

It may be learned with reference to the example in the foregoing embodiment that the first key data includes the first attack signature (that is, "1=1"), and the second key data does not include the first attack signature. In addition, in the second network traffic, the first attack signature has been deformed to "(IF((USER( )LIKE 'ro%'), 1, o))=1". When detecting the second network traffic based on the signature matching-based detection method, the second network traffic does not include the first attack signature (that is, "1=1"). If the signature database does not include the attack signature "(IF((USER( )LIKE 'ro%'), 1, o))=1" obtained after deformation, the network protection device determines that the second network traffic is not aggressive. In this way, an attacker may execute the foregoing statement "select top 1 password from [admin]" in the URL, to obtain a username, and therefore, an attack succeeds. In this embodiment of this application, when the second network traffic does not include the first attack signature, the network protection device continues to detect the second network traffic based on the target attack detection model. Because the target attack detection model can identify "select", "top", "password", and "admin", a detection result of the network protection device is that the second network traffic is aggressive.

It should be noted that, in an implementation, if the network protection device determines, based on the second matching result, that the second network traffic is aggressive, the network protection device skips performing step 2042 and related steps after step 2042, and directly performs an action response for the second network traffic based on a first preset action described below. The network protection device generally includes two independent functional modules that are separately referred to as a signature database matching engine and a model matching module. The signature database matching engine is configured to match key data with the attack signature in the signature database. The model matching module is configured to determine, based on the attack detection model, whether network traffic is aggressive. Generally, performance of the signature database matching engine is higher than performance of the model matching module. Therefore, in a procedure of processing the network traffic, the signature database matching engine is placed in front of the model matching module. If it can be directly determined, based on the signature database matching engine, that the network traffic is aggressive, processing performed by the model matching module on the network traffic is omitted, so that processing performance of the network protection device can be significantly improved, and a transmission delay caused by security protection can be reduced.

Optionally, when the network protection device determines, based on the signature database, that the second network traffic is aggressive, the network protection device adds the second network traffic to the sample set, to update the attack detection model again. The network protection device performs the following process: The network protection device obtains a new target attack detection model based on the second network traffic, and updates the attack detection model (that is, replaces the target attack detection model obtained based on the first network traffic with the new target attack detection model). Then, the network protection device continues to detect next network traffic (for example, third network traffic) received by the network protection device, and the network protection device determines, based on the new target attack detection model (an attack detection model obtained based on the second network traffic), whether the next network traffic received by the network protection device is aggressive.

Optionally, with reference to FIG. 2C, as shown in FIG. 2D, after step 204, the network attack detection method provided in this embodiment of this application further includes step 204'.

Step 204': When the network protection device determines, based on the target attack detection model, that the second network traffic is aggressive, the network protection device performs an action response for the second network traffic based on a first preset action.

Step 200 to step 204, step 2021, step 2022, step 2041, step 2042', and step 2042 in FIG. 2D are similar to the implementation in FIG. 2C, and are not described herein again.

In this embodiment of this application, the network protection device detects network traffic flowing through the network protection device, and can perform, based on a detection result and a preset action, a corresponding action response for the network traffic flowing through the network protection device. For example, the first preset action is used by the network protection device to perform an action response for aggressive network traffic, and a second preset action is used by the network protection device to perform an action response for non-aggressive network traffic. When the network protection device detects that the network traffic flowing through the network protection device is aggressive, the network protection device performs an action response for the network traffic based on the first preset action. When the network protection device detects that the network traffic flowing through the network protection device is not aggressive (that is, non-aggressive), the network protection device performs an action response for the network traffic based on the second preset action.

Optionally, the first preset action includes block or alert, and the second preset action includes allow.

It should be noted that the first preset action or the second preset action in this embodiment of this application may be replaced with another action. This is not limited in this embodiment of this application. For example, the first preset action may be replaced with allow.

With reference to step 204', in an implementation, if the network protection device determines that the second network traffic is aggressive, and the first preset action is block, that the network protection device performs an action response for the second network traffic based on a first preset action includes: The network protection device stops sending the second network traffic to a next-hop device of the network protection device. In this way, the network protection device can prevent the second network traffic from flowing into the next-hop device of the network protection device from the network protection device, to further prevent the second network traffic from continuing to flow into another device in the network, so that a network attack can be prevented in a timely manner.

With reference to step 204', in an implementation, if the network protection device determines that the second network traffic is aggressive, and the first preset action is alert, that the network protection device performs an action response for the second network traffic based on a first preset action needs to include the following manner A, B, or C.

Manner A: The network protection device outputs alert information by using an output device, and receives an instruction returned for the alert information.

The instruction returned for the alert information includes a first instruction and a second instruction. When the instruction is the first instruction, the network protection device stops sending the second network traffic to a next-hop device of the network protection device. When the instruction is the second instruction, the network protection device sends the second network traffic to the next-hop device of the network protection device.

Responding of the network protection device in the manner A is an online responding manner. To be specific, after outputting the alert information, the network protection device waits for feedback (that is, the first instruction and the second instruction) of a user for the alert information, and then performs a corresponding action based on the feedback of the user.

Manner B: The network protection device outputs alert information by using an output device, and stops sending the second network traffic to a next-hop device of the network protection device.

Manner C: The network protection device outputs alert information by using an output device, and sends the second network traffic to a next-hop device of the network protection device.

Responding of the network protection device in the manner B and the manner C is an offline responding manner. To be specific, after the network protection device outputs the alert information (the alert information is only used to notify a user), the network protection device does not need to wait for feedback of the user for the alert information, but performs responding in a timely manner based on a preset action.

Optionally, with reference to FIG. 2C, as shown in FIG. 2E, after step 204, the network attack detection method provided in this embodiment of this application further includes step 204".

Step 204": When the network protection device determines, based on the target attack detection model, that the second network traffic is not aggressive, the network protection device performs an action response for the second network traffic based on a second preset action.

It may be learned with reference to the descriptions in the foregoing embodiment that the second preset action is used by the network protection device to perform an action response for non-aggressive network traffic, and the second preset action includes allow.

With reference to step 204", in an implementation, if the network protection device determines that the second network traffic is not aggressive, and the first preset action is allow, that the network protection device performs an action response for the second network traffic based on a second preset action includes: The network protection device sends the second network traffic to a next-hop device of the network protection device.

Step 200 to step 204, step 2021, step 2022, step 2041, step 2042', and step 2042 in FIG. 2E are similar to the implementation in FIG. 2C, and are not described herein again.

In this embodiment of this application, the network protection device determines, based on the target attack detection model, whether the second network traffic is aggressive, and performs a corresponding action response. Then, the network protection device continues to perform, by using the network attack detection method provided in this embodiment of this application, network attack detection on next network traffic received by the network protection device.

Optionally, in this embodiment of this application, when the network protection device matches the first key data (the first key data is obtained from the first network traffic) with the attack signature in the signature database, and the matching result indicates that the key data does not include the attack signature in the signature database, the network protection device releases a packet included in the first network traffic and buffered in the network protection device.

With reference to FIG. 2C, as shown in FIG. 2F, after step 201 (that is, the network protection device matches the first key data with the attack signature in the signature database to obtain the first matching result), the attack detection method provided in this embodiment of this application further includes step 201'.

Step 201': If the network protection device determines, based on the first matching result, that the first network traffic is aggressive, the network protection device performs an action response for the first network traffic based on a first preset action.

Step 200 to step 204, step 2021, step 2022, step 2041, step 2042', and step 2042 in FIG. 2F are similar to the implementation in FIG. 2C, and are not described herein again.

For detailed descriptions of performing, by the network protection device, the action response for the first network traffic based on the first preset action, refer to related descriptions of performing, by the network protection device, the action response for the second network traffic based on the first preset action (that is, step 204') in the foregoing embodiment. Details are not described herein again.

In this embodiment of this application, when the network protection device determines, based on the first matching result, that the first network traffic is aggressive, the network protection device performs step 202 (obtaining the target attack detection model based on the first network traffic), and also performs step 201'. It should be noted that a sequence in which the network protection device performs step 202 and step 201' is not limited in this embodiment of this application. In other words, the network protection device performs step 202 before step 201', performs step 201' before step 202, or simultaneously performs step 202 and step 201'.

It should be noted that, in this embodiment of this application, if the network protection device determines, based on the first matching result, that the first network traffic is not aggressive, the network protection device determines, based on an original attack detection model, whether the first network traffic is aggressive. The original attack detection model is obtained by training the first sample set based on a predetermined algorithm.

It can be learned from the descriptions in the foregoing embodiment that, after receiving the first network traffic, the network protection device first detects the first network traffic for a first time based on a signature matching-based detection method. After the first detection, if the network protection device determines that the first network traffic is not aggressive, the network protection device detects the first network traffic for a second time based on the original attack detection model, and determines, based on output of the original attack detection model, whether the first network traffic is aggressive, so that the network protection device performs a corresponding action response for the first network traffic.

Optionally, if the first network traffic is network traffic received by the network protection device for the first time, the original attack detection model is actually an original attack detection model obtained through training based on a sample set pre-stored in the network protection device (sample sets pre-stored in different network protection devices may be the same or different). If the first network traffic is not network traffic received by the network protection device for the first time, the original attack detection model may be an original attack detection model, or may be another attack detection model that is different from the original attack detection model and that is obtained by training a sample set updated based on the pre-stored sample set. This is not limited in this embodiment of this application. Optionally, the attack detection model is updated in real time. For example, each time after the network protection device determines aggressive network traffic based on the signature database, the network protection device immediately adds the aggressive network traffic to the sample set as a new black sample set to update the sample set, and trains the attack detection model again based on the updated sample set. Alternatively, the attack detection model is updated periodically. For example, each time after the network protection device determines aggressive network traffic based on the signature database, the network protection device immediately adds the aggressive network traffic to the sample set as a new black sample set to update the sample set, and the network protection device periodically trains the attack detection model again based on the updated sample set in a specified period (for example, every 24 hours or every week).

Optionally, in this embodiment of this application, when the network protection device determines, based on the target attack detection model, that the first network traffic is aggressive, the network protection device performs an action response for the first network traffic based on a first preset action. When the network protection device determines, based on the original attack detection model, that the first network traffic is not aggressive, the network protection device performs an action response for the first network traffic based on a second preset action.

In this embodiment of this application, a process in which the network protection device performs the action response for the first network traffic is similar to the foregoing process in which the network protection device performs the action response for the second network traffic. Therefore, for descriptions of performing the action response for the first network traffic by the network protection device, refer to related descriptions in the foregoing embodiments. Details are not described herein again.

Figure 3:
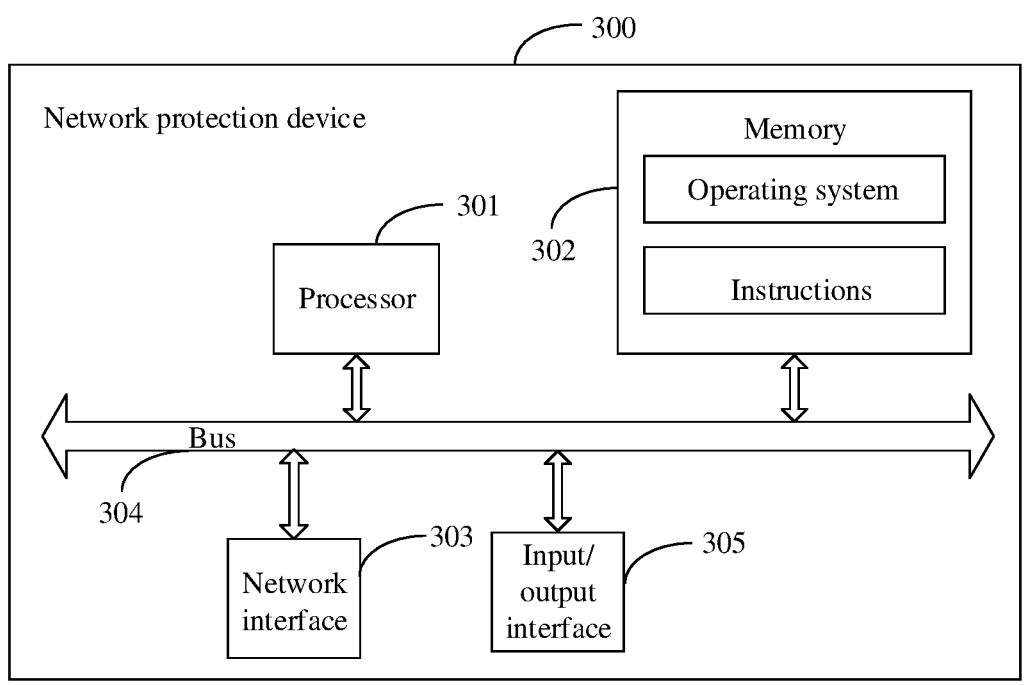
FIG. 3 is a schematic diagram of a structure of a network protection device according to an embodiment of this application.

Correspondingly, an embodiment of this application further provides a network protection device, to implement the network attack detection method described in the foregoing embodiments. FIG. 3 is a schematic diagram of a structure of a network protection device according to an embodiment of this application. Optionally, a network protection device 300 shown in FIG. 3 is an integrated device of the firewall and the analysis device in the application scenario shown in FIG. 1, or the network protection device in the schematic diagram of the method shown in FIG. 2A, FIG. 2C, FIG. 2D, FIG. 2E, or FIG. 2F. The network protection device 300 includes at least one processor 301 and a memory 302.

The processor 301 includes one or more central processing units (CPUs). The CPU is a single-CPU or a multi-CPU.

The memory 302 includes but is not limited to a random access memory (RAM), a read-only memory (ROM), an erasable programmable read-only memory (EPROM), a flash memory, an optical memory, or the like. The memory 302 stores code of an operating system.

Optionally, the processor 301 implements the method in the foregoing embodiment by reading instructions stored in the memory 302, or the processor 301 implements the method in the foregoing embodiment by using internally stored instructions. When the processor 301 implements the method in the foregoing embodiment by reading the instructions stored in the memory 302, the memory 302 stores instructions for implementing the network attack detection method provided in embodiments of this application.

After program code stored in the memory 302 is read by the at least one processor 301, the network protection device 300 performs the following operations: obtaining first key data from first network traffic, and matching the first key data with an attack signature in a signature database to obtain a first matching result, where the first key data is data obtained from a specified field of a parsing result obtained after protocol parsing is performed on one or more packets included in the first network traffic, and the first matching result includes an attack signature included in both the first key data and the signature database; if the network protection device determines, based on the first matching result, that the first network traffic is aggressive, obtaining a target attack detection model based on the first network traffic, where the target attack detection model is used to identify one or more attack signatures, and the one or more attack signatures are different from the attack signature in the signature database; and further determining, based on the target attack detection model, whether second network traffic is aggressive.

Optionally, the network protection device 300 shown in FIG. 3 further includes a network interface 303. The network interface 303 is a wired interface, for example, a fiber distributed data interface (FDDI) or a gigabit Ethernet (GE) interface. Alternatively, the network interface 303 is a wireless interface. The network interface 303 is configured to receive network traffic, such as the first network traffic and the second network traffic. Alternatively, the network interface 303 is configured to send the network traffic to another device in a network based on a result obtained after the processor 301 determines whether the network traffic is aggressive.

The memory 302 is configured to store the network traffic received by the network interface 303. Optionally, the memory 302 is further configured to store a sample set (used to train an attack detection model), the attack detection model, and the like. The at least one processor 301 further performs, based on these entries stored in the memory 302, the method described in the foregoing method embodiments. For more details about implementing the foregoing functions by the processor 301, refer to descriptions in the foregoing method embodiments. Details are not repeated herein.

Optionally, the network protection device 300 further includes a bus 304. The processor 301 and the memory 302 are generally connected to each other through the bus 304, or are connected to each other in another manner.

Optionally, the network protection device 300 further includes an input/output interface 305. The input/output interface 305 is configured to: connect to an input device, and receive a detection requirement that is input by a user by using the input device (for example, detect network traffic of a specified protocol and network traffic of a specified network segment). The input device includes but is not limited to a keyboard, a touchscreen, a microphone, and the like. The input/output interface 305 is further configured to: connect to an output device, and output a detection result of the processor 301 (that is, whether the network traffic is aggressive). The output device includes but is not limited to a display, a printer, and the like.

The network protection device provided in this embodiment of this application is configured to perform the network attack detection method provided in the foregoing method embodiments. Because the target attack detection model obtained by the network protection device based on the first network traffic can identify more attack signatures, when the network protection device performs attack detection on the second network traffic based on the target attack detection model, a detection effect of network attack detection can be improved.

Figure 4:
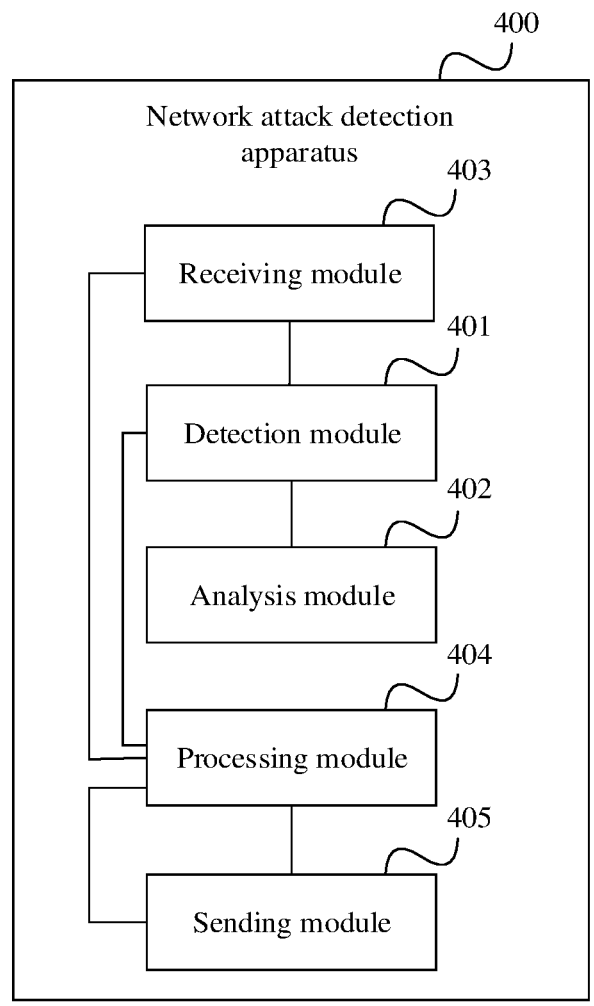
FIG. 4 is a schematic diagram of a structure of a network attack detection apparatus according to an embodiment of this application.

FIG. 4 is a schematic diagram of a structure of a network attack detection apparatus according to an embodiment of this application. A network attack detection apparatus 400 includes a detection module 401, an analysis module 402, and a receiving module 403.

The detection module 401 is configured to: obtain first key data from first network traffic received by the receiving module 403, and match the first key data with an attack signature in a signature database to obtain a first matching result, where the first key data is data obtained from a specified field of a parsing result obtained after the detection module 401 performs protocol parsing on one or more packets included in the first network traffic, and the first matching result includes an attack signature included in both the first key data and the signature database.

The specified field is a hypertext transfer protocol HTTP payload of the one or more packets. The first key data is data obtained from an HTTP payload field of a parsing result obtained after the detection module 401 performs application layer protocol parsing on the one or more packets included in the first network traffic. Alternatively, the first key data is file data that is carried by the first network traffic and that is obtained after the detection module 401 performs application layer protocol parsing on the one or more packets included in the first network traffic and reassembles HTTP payload fields of parsing results.

The analysis module 402 is configured to: if the detection module 401 determines, based on the first matching result, that the first network traffic is aggressive, obtain a target attack detection model based on the first network traffic, where the target attack detection model is used to identify one or more attack signatures, and the one or more attack signatures are different from the attack signature in the signature database.

The receiving module 403 is configured to receive second network traffic.

The detection module 401 is further configured to determine, based on the target attack detection model, whether the second network traffic is aggressive.

Optionally, the detection module 401 is specifically configured to: obtain second key data from the second network traffic, input the second key data to the target attack detection model, and determine, based on output of the target attack detection model, whether the second network traffic is aggressive, where the second key data is data obtained from a specified field of a parsing result obtained after the detection module 401 performs protocol parsing on the one or more packets included in the second network traffic.

The specified field is a hypertext transfer protocol HTTP payload of the one or more packets. The second key data is data obtained from an HTTP payload field of a parsing result obtained after the detection module 401 performs application layer protocol parsing on the one or more packets included in the second network traffic. Alternatively, the second key data is file data that is carried by the second network traffic and that is obtained after the detection module 401 performs application layer protocol parsing on the one or more packets included in the second network traffic and reassembles HTTP payload fields of parsing results.

Optionally, the detection module 401 is further configured to: match the second key data with the attack signature in the signature database to obtain a second matching result, and determine, based on the second matching result, that the second network traffic is not aggressive, where the second matching result includes an attack signature included in both the second key data and the signature database.

Optionally, the network protection apparatus 400 further includes a processing module 404.

The processing module 404 is configured to: when the detection module 401 determines, based on the target attack detection model, that the second network traffic is aggressive, perform an action response for the second network traffic based on a first preset action. Optionally, the first preset action includes block or alert.

Optionally, the network attack detection apparatus 400 provided in this embodiment of this application further includes a sending module 405.

When the first preset action is block, the processing module 404 is specifically configured to control the sending module 405 to stop sending the second network traffic to a next-hop device of the network protection apparatus.

When the first preset action is alert, the processing module 404 is specifically configured to: control the sending module 405 to output alert information by using an output device, and control the receiving module 403 to receive an instruction returned for the alert information, where the instruction includes a first instruction and a second instruction. When the instruction is the first instruction, the sending module 405 stops sending the second network traffic to a next-hop device of the network protection apparatus; or when the instruction is the second instruction, the sending module 405 sends the second network traffic to a next-hop device of the network protection apparatus. Alternatively, the processing module 404 is specifically configured to: control the sending module 405 to output alert information by using an output device and stop sending the second network traffic to a next-hop device of the network protection apparatus. Alternatively, the processing module 404 is specifically configured to: control the sending module 405 to output alert information by using an output device and send the second network traffic to a next-hop device of the network protection apparatus.

Optionally, the processing module 404 is further configured to: when the detection module 401 determines, based on the target attack detection model, that the second network traffic is not aggressive, perform an action response for the second network traffic based on a second preset action.

Optionally, the second preset action is allow. The processing module 404 is specifically configured to control the sending module 405 to send the second network traffic to a next-hop device of the network protection apparatus.

Optionally, the analysis module 402 is specifically configured to: add the first network traffic to a first sample set as a black sample, to obtain a second sample set, where the first sample set includes at least one black sample; and train the second sample set based on a predetermined algorithm to obtain the target attack detection model.

Optionally, the detection module 401 is further configured to: when it is determined, based on the first matching result, that the first network traffic is not aggressive, determine, based on an original attack detection model, whether the first network traffic is aggressive, where the original attack detection model is obtained by training the first sample set based on the predetermined algorithm.

The apparatus embodiment described in FIG. 4 is merely an example. For example, the module division is merely logical function division, and there may be other division manners in actual implementation. For example, a plurality of modules or components may be combined or integrated into another system, or some signatures may be ignored or may not be performed. Function modules in embodiments of this application may be integrated into one processing module, or each of the modules may exist alone physically, or two or more modules are integrated into one module. The foregoing modules in FIG. 4 may be implemented in a form of hardware, or may be implemented in a form of a software function unit. For example, in software implementation, the detection module 401, the analysis module 402, and the processing module 404 may be implemented by a software function module generated after the at least one processor 301 in FIG. 3 reads the program code stored in the memory. The foregoing modules in FIG. 4 may alternatively be implemented by different hardware in the network protection device. For example, the detection module 401 and the analysis module 402 are implemented by a part of processing resources (for example, one core or two cores in a multi-core processor) in the at least one processor 301 in FIG. 3, and the processing module 404 is implemented by a remaining part of processing resources (for example, another core in the multi-core processor) in the at least one processor 301 in FIG. 3, or may be implemented by using a programmable component such as a field-programmable gate array (FPGA) or a coprocessor. The receiving module 403 and the sending module 405 are implemented by the network interface 303 in FIG. 3. It is clearly that the foregoing function modules may alternatively be implemented in a combination of software and hardware. For example, the analysis module 402 is implemented by a hardware programmable component, and the detection module 401 and the processing module 404 are software function modules generated after a CPU reads the program code stored in the memory.

For more details of implementing the foregoing functions by the detection module 401, the analysis module 402, the receiving module 403, the processing module 404, and the sending module 405 in FIG. 4, refer to the descriptions in the foregoing method embodiments. Details are not repeated herein.

Embodiments in this specification are all described in a progressive manner, for same or similar parts in embodiments, refer to these embodiments, and each embodiment focuses on a difference from other embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

It is clearly that a person skilled in the art can make various modifications and variations to this application without departing from the scope of this application. This application is intended to cover these modifications and variations provided that they fall within the scope of protection defined by the following claims.

What is claimed is:

1. A method comprising:
performing, by a network protection device, protocol parsing on one or more packets comprised in received first network traffic, to obtain one or more first parsing results comprising one or more first preset fields, the one or more first preset fields comprising first key data;
obtaining, by the network protection device, the first key data from the one or more first preset fields, and matching the first key data with one or more first attack signatures in a signature database to obtain a first matching result, the first matching result comprising a first attack signature comprised in both the first key data and the signature database;

determining, by the network protection device based on the first matching result, whether the first network traffic is aggressive;

in response to determining, by the network protection device based on the first matching result, that the first network traffic is aggressive, adding, by the network protection device, the first network traffic to a first sample set as a black sample, to obtain a second sample set, wherein the first sample set comprises at least one black sample, and training, by the network protection device, an original attack detection model using the second sample set based on a predetermined algorithm, to obtain a target attack detection model, the target attack detection model being configured to identify one or more attack signatures different from the one or more attack signatures in the signature database;

receiving, by the network protection device, second network traffic;

determining, by the network protection device based on the target attack detection model, whether the second network traffic is aggressive; and in response to determining, based on the target attack detection model, that the second network traffic is not aggressive, performing, by the network protection device, an action response for the second network traffic based on a second preset action, wherein when the second preset action is allowing, performing, by the network protection device, the action response for the second network traffic based on the second preset action comprises:

sending, by the network protection device, the second network traffic to a next-hop device of the network protection device.

2. The method according to claim 1, wherein determining, by the network protection device based on the target attack detection model, whether the second network traffic is aggressive comprises:

performing, by the network protection device, protocol parsing on one or more packets comprised in the second network traffic, to obtain one or more second parsing results comprising one or more second preset fields, the one or more second preset fields comprising second key data; and inputting, by the network protection device, the second key data to the target attack detection model, and determining, based on an output of the target attack detection model, whether the second network traffic is aggressive.

3. The method according to claim 2, wherein the one or more first preset fields of the one or more first parsing results and the one or more second preset fields of the one or more second parsing results are hypertext transfer protocol (HTTP) payload fields, and when the network protection device is used for intrusion prevention:

the first key data is data obtained from an HTTP payload field of the one or more first parsing results, the one or more first parsing results being a result of application layer protocol parsing performed by the network protection device on the one or more packets comprised in the first network traffic; and the second key data is data obtained from an HTTP payload field of the one or more second parsing results, the one or more second parsing results being a result of application layer protocol parsing performed by the network protection device on the one or more packets comprised in the second network traffic.

4. The method according to claim 2, wherein the one or more first preset fields of the one or more first parsing results and the one or more second preset fields of the one or more second parsing results are HTTP payload fields, and when the network protection device is used for antivirus:

the first key data is file data that is carried by the first network traffic and that is obtained by the network protection device by performing application layer protocol parsing on the one or more packets comprised in the first network traffic and reassembling HTTP payload fields of the one or more first parsing results; and the second key data is file data that is carried by the second network traffic and that is obtained by the network protection device by performing application layer protocol parsing on the one or more packets comprised in the second network traffic and reassembling HTTP payload fields of the one or more second parsing results.

5. The method according to claim 2, wherein before inputting, by the network protection device, the second key data to the target attack detection model, and determining, based on the output of the target attack detection model, whether the second network traffic is aggressive, the method further comprises:

matching, by the network protection device, the second key data with the one or more attack signatures in the signature database to obtain a second matching result, and determining, based on the second matching result, that the second network traffic is not aggressive, wherein the second matching result comprises a second attack signature comprised in both the second key data and the signature database.

6. The method according to claim 1, wherein the method further comprises:

when the network protection device determines, based on the target attack detection model, that the second network traffic is aggressive, performing, by the network protection device, an action response for the second network traffic based on a first preset action.

7. The method according to claim 6, wherein the first preset action comprises blocking or alerting;

when the first preset action is blocking, performing, by the network protection device, the action response for the second network traffic based on the first preset action comprises:

stopping, by the network protection device, sending the second network traffic to the next-hop device of the network protection device; or when the first preset action is alerting, performing, by the network protection device, the action response for the second network traffic based on the first preset action comprises:

outputting, by the network protection device, alert information using an output device, and receiving an instruction returned for the alert information, wherein the instruction comprises a first instruction and a second instruction; and when the instruction is the first instruction, stopping, by the network protection device, sending the second network traffic to the next-hop device of the network protection device; or when the instruction is the second instruction, sending, by the network protection device, the second network traffic to the next-hop device of the network protection device;

outputting, by the network protection device, alert information using an output device, and stopping, by the network protection device, sending the second network traffic to the next-hop device of the network protection device; or outputting, by the network protection device, alert information using an output device, and sending, by the network protection device, the second network traffic to the next-hop device of the network protection device.

8. The method according to claim 1, wherein the method further comprises:

in response to determining, by the network protection device based on the first matching result, that the first network traffic is not aggressive, determining, by the network protection device based on the original attack detection model, whether the first network traffic is aggressive, wherein the original attack detection model is obtained based on training of the first sample set according to the predetermined algorithm.

9. A network protection device, comprising at least one processor and a non-transitory memory coupled with the at least one processor, wherein the memory comprises instructions, which when executed by the at least one processor, cause the network protection device to:

perform protocol parsing on one or more packets comprised in received first network traffic, to obtain one or more first parsing results comprising one or more first preset fields, the one or more first preset fields comprising first key data;

obtain the first key data from the one or more first preset fields, and match the first key data with one or more attack signatures in a signature database to obtain a first matching result, the first matching result comprising a first attack signature comprised in both the first key data and the signature database;

determine, based on the first matching result, whether the first network traffic is aggressive;

in response to determining, based on the first matching result, that the first network traffic is aggressive, adding the first network traffic to a first sample set as a black sample, to obtain a second sample set, wherein the first sample set comprises at least one black sample, and training an original attack detection model using the second sample set based on a predetermined algorithm, to obtain a target attack detection model, the target attack detection model being configured to identify one or more attack signatures different from the attack signature in the signature database;

receive second network traffic;

determine, based on the target attack detection model, whether the second network traffic is aggressive; and in response to determining, based on the target attack detection model, that the second network traffic is not aggressive, perform an action response for the second network traffic based on a second preset action, wherein when the second preset action is allowing, performing the action response for the second network traffic based on the second preset action comprises:

sending the second network traffic to a next-hop device of the network protection device.

10. The network protection device according to claim 9, wherein the instructions, when executed by the at least one processor, further cause the network protection device to:

performing protocol parsing on one or more packets comprised in the second network traffic, to obtain one or more second parsing results comprising one or more second preset fields, the one or more second preset fields comprising second key data; and input the second key data to the target attack detection model, and determine, based on output of the target attack detection model, whether the second network traffic is aggressive.

11. The network protection device according to claim 10, wherein the one or more first preset fields of the one or more first parsing results and the one or more second preset fields of the one or more second parsing results are hypertext transfer protocol (HTTP) payload fields, and the instructions, when executed by the at least one processor, cause the network protection device to:

when the network protection device is used for intrusion prevention, perform application layer protocol parsing on the one or more packets comprised in the received first network traffic, to obtain the one or more first parsing results, and obtain the first key data from an HTTP payload field of the one or more first parsing results; and perform application layer protocol parsing on the one or more packets comprised in the second network traffic, to obtain the one or more second parsing results, and obtain the second key data from an HTTP payload field of the one or more second parsing results.

12. The network protection device according to claim 10, wherein the one or more first preset fields of the one or more first parsing results and the one or more second preset fields of the one or more second parsing results are HTTP payload fields and the instructions, when executed by the at least one processor, cause the network protection device to:

when the network protection device is used for anti virus, perform application layer protocol parsing on the one or more packets comprised in the received first network traffic, to obtain the one or more first parsing results, and obtain the first key data by reassembling HTTP payload fields of the one or more first parsing results, the first key data being file data; and when the network protection device is used for anti virus, perform application layer protocol parsing on the one or more packets comprised in the second network traffic, to obtain the one or more second parsing results, and obtain the second key data by reassembling HTTP payload fields of parsing results, the second key data being file data.

13. The network protection device according to claim 10, wherein the instructions, when executed by the at least one processor, further cause the network protection device to:

match the second key data with the one or more attack signatures in the signature database to obtain a second matching result, and determine, based on the second matching result, that the second network traffic is not aggressive, wherein the second matching result comprises a second attack signature comprised in both the second key data and the signature database.

14. The network protection device according to claim 10, wherein the instructions, when executed by the at least one processor, further cause the network protection device to:

when the network protection device determines, based on the target attack detection model, that the second network traffic is aggressive, perform an action response for the second network traffic based on a first preset action.

15. The network protection device according to claim 9, wherein the instructions, when executed by the at least one processor, further cause the network protection device to:

when the network protection device determines, based on the first matching result, that the first network traffic is not aggressive, determine, based on the original attack detection model, whether the first network traffic is aggressive, wherein the original attack detection model is obtained based on training of the first sample set according to the predetermined algorithm.

16. A non-transitory computer-readable storage medium comprising computer instructions, the computer instructions, when being run on a network protection device, causing the network protection device to:

perform protocol parsing on one or more packets comprised in received first network traffic, to obtain one or more first parsing results comprising one or more first preset fields, the one or more first preset fields comprising first key data; and obtain the first key data from the one or more first preset fields, and match the first key data with one or more attack signatures in a signature database to obtain a first matching result, the first matching result comprising a first attack signature comprised in both the first key data and the signature database;

determine, based on the first matching result, whether the first network traffic is aggressive;

in response to determining, based on the first matching result, that the first network traffic is aggressive, add the first network traffic to a first sample set as a black sample, to obtain a second sample set, the first sample set comprising at least one black sample, and train an original attack detection model using the second sample set based on a predetermined algorithm, to obtain a target attack detection model, the target attack detection model being configured to identify one or more attack signatures different from the attack signature in the signature database;

receive second network traffic;

determine, based on the target attack detection model, whether the second network traffic is aggressive; and in response to determining, based on the target attack detection model, that the second network traffic is not aggressive, perform an action response for the second network traffic based on a second preset action, wherein when the second preset action is allowing, performing the action response for the second network traffic based on the second preset action comprises:

sending the second network traffic to a next-hop device of the network protection device.

17. The non-transitory computer-readable storage medium according to claim 16, wherein determining, based on the target attack detection model, whether the second network traffic is aggressive comprises:

performing protocol parsing on one or more packets comprised in the second network traffic, to obtain one or more second parsing results comprising one or more second preset fields, the one or more second preset fields comprising second key data; and inputting the second key data to the target attack detection model, and determining, based on an output of the target attack detection model, whether the second network traffic is aggressive.

18. The non-transitory computer-readable storage medium according to claim 16, wherein the computer instructions, when being run on the computer, further cause the computer to:

in response to determining, based on the first matching result, that the first network traffic is not aggressive, determining, based on the original attack detection model, whether the first network traffic is aggressive, wherein the original attack detection model is obtained based on training of the first sample set according to the predetermined algorithm.

19. The non-transitory computer-readable storage medium according to claim 17, wherein the one or more first preset fields of the one or more first parsing results and the one or more second preset fields of the one or more second parsing results are hypertext transfer protocol (HTTP) payload fields, and when the network protection device is used for intrusion prevention:

the first key data is data obtained from an HTTP payload field of the one or more first parsing results, the one or more first parsing results being a result of application layer protocol parsing performed on the one or more packets comprised in the first network traffic; and the second key data is data obtained from an HTTP payload field of the one or more second parsing results, the one or more second parsing results being a result of application layer protocol parsing performed on the one or more packets comprised in the second network traffic.

20. The non-transitory computer-readable storage medium according to claim 17, wherein the one or more first preset fields of the one or more first parsing results and the one or more second preset fields of the one or more second parsing results are HTTP payload fields, and when the network protection device is used for antivirus:

the first key data is file data that is carried by the first network traffic and that is obtained by performing application layer protocol parsing on the one or more packets comprised in the first network traffic and reassembling HTTP payload fields of the one or more first parsing results; and the second key data is file data that is carried by the second network traffic and that is obtained by performing application layer protocol parsing on the one or more packets comprised in the second network traffic and reassembling HTTP payload fields of the one or second parsing results.

* * * * *